United States Patent [19]

Van Der Schaaf et al.

[11] Patent Number: 5,821,278
[45] Date of Patent: Oct. 13, 1998

[54] PROCESS FOR POLYMERIZING OF CYCLIC OLEFINS AND A PHOTOPOLYMERIZABLE COMPOSITION

[75] Inventors: Paul Adriaan Van Der Schaaf, Fribourg; Andreas Hafner, Laupen; Andreas Mühlebach, Belfaux, all of Switzerland

[73] Assignee: Ciba Specialty Chemicals Corporation, Tarrytown, N.Y.

[21] Appl. No.: 836,227

[22] PCT Filed: Nov. 6, 1995

[86] PCT No.: PCT/EP95/04363

§ 371 Date: May 22, 1997

§ 102(e) Date: May 22, 1997

[87] PCT Pub. No.: WO96/16104

PCT Pub. Date: May 30, 1996

[30] Foreign Application Priority Data

Nov. 17, 1994 [CH] Switzerland ............... 3461/94

[51] Int. Cl.$^6$ ............... C08F 2/46; C08F 2/48; C08F 4/68; C08F 32/00
[52] U.S. Cl. ............... 522/66; 522/29; 522/184; 522/186; 522/167; 522/168; 522/172; 522/173; 522/180; 522/182; 526/113; 526/170; 526/172; 526/256; 526/258; 526/266; 526/279; 526/308; 526/309
[58] Field of Search ............... 526/113, 127, 526/170, 172, 256, 258, 266, 279, 308, 309; 522/66, 184, 186, 29, 167, 168, 172, 173, 180, 182

[56] References Cited

U.S. PATENT DOCUMENTS

| | | | |
|---|---|---|---|
| 4,060,468 | 11/1977 | Castner | 204/158 R |
| 5,198,511 | 3/1993 | Brown-Wensley et al. | 526/113 |
| 5,371,158 | 12/1994 | Brekner et al. | 526/127 |
| 5,616,663 | 4/1997 | Imuta et al. | 526/127 |

FOREIGN PATENT DOCUMENTS

| | | |
|---|---|---|
| 0407870 | 1/1991 | European Pat. Off. . |
| 9501388 | 1/1995 | WIPO . |

*Primary Examiner*—Susan W. Berman
*Attorney, Agent, or Firm*—Luther A. R. Hall

[57] ABSTRACT

Process for the photocatalytic polymerization of a cyclic olefin or at least two different cyclic olefins in the presence of a metal compound as catalyst, which comprises carrying out a photochemical ring-opening metathesis polymerization in the presence of a catalytic amount of at least one heat-stable niobium(V) or tantalum(V) compound which contains at least two methyl groups or two monosubstituted methyl groups bound to the metal, the substituent containing no hydrogen atom in the α-position.

The process can also be carried out by first performing the irradiation and completing the polymerization by heating. The process is suitable, for example, for the preparation of thermoplastic molding materials, coatings and relief images.

26 Claims, No Drawings

PROCESS FOR POLYMERIZING OF CYCLIC OLEFINS AND A PHOTOPOLYMERIZABLE COMPOSITION

The present invention relates to a process for the polymerization of cyclic olefins by photochemical ring-opening metathesis polymerization using catalytic amounts of a niobium or tantalum catalyst which contains at least two methyl groups or two monosubstituted methyl groups, without α-hydrogen atoms in the substituent, bound to the metal, and to compositions comprising these olefins together with a catalytic amount of this catalyst.

Thermally induced ring-opening metathesis polymerization using catalytic amounts of metal catalysts has already been known for a relatively long time and has been described in several instances in the literature [cf., for example, Ivin, K. J., Olefin Metathesis 1–12, Academic Press, London (1983)]. Polymers which can be prepared in this manner are prepared industrially and are commercially obtainable. On the other hand, only little has been disclosed on photochemically induced ring-opening metathesis polymerization, and as yet there have been no commercial applications.

It is known from U.S. Pat. No. 4,060,468 to carry out an olefin metathesis polymerization by introducing a two-component mixture of a metal salt chosen from the group consisting of tungsten, molybdenum, rhenium and tantalum salts and a substituted phenol or benzyl alcohol as cocatalysts to a reaction vessel with the monomeric olefin, and then irradiating the entire reaction mixture with UV light. Olefins which are mentioned are only cyclic and acyclic hydrocarbons without functional groups or substituents. Separate storage of the catalyst components and the process step of mixing the catalyst components directly before the actual reaction render the known process industrially expensive and cumbersome.

Tanielan et al. [Tanielan, C., Kieffer, R., Harfouch, A., Tetrahedron Letters 52: 4589–4592 (1977)] describe the catalyst system $W(CO)_6/CCl_4$, which, after irradiation with UV light, can be employed for metathesis polymerization of cyclopentene and norbornene. Metal carbonyls are volatile and toxic, so that their use requires expensive safety precautions for physiological reasons. Furthermore, a free radical addition reaction to form monomeric 1-chloro-2-trichloromethyl-cycloalkanes is observed as a competing reaction.

It is known from Thoi, H. H., Ivin, K. J., Rooney, J. J., J. Mol. Catal. 15:245–270 (1982)] that a tungsten pentacarbonyl-carbene complex of the formula

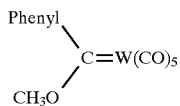

is a thermal catalyst for ring-opening metathesis polymerization of dimethylnorbornene, and, together with phenylacetylene as a cocatalyst, is also a photocatalyst system for the same polymerization. This catalyst system has the serious disadvantage that it has only a low storage stability as the ready-to-use formulation, the carbonyl compound is physiologically unacceptable, and the tolerance towards functional groups in cycloolefins is too low.

Feldmann et al. [Feldmann, C., et al., in: Stephen J. Lippard (Ed.) Progress in Inorganic Chemistry, 39:3–73 (1991)] describe molybdenum- and tungsten-alkylidene complexes which are thermal catalysts for the polymerization of cycloolefins which by themselves have only a weak action, but together with Lewis acids are active.

The known photochemically activatable catalysts thus always require a cocatalyst, which means that the quality of the polymers prepared can vary greatly due to the chosen nature and sequence of the reagents.

Polymers can be prepared from cyclic olefins by photochemical ring-opening metathesis polymerization by the known processes only with high expenditure and in an economically unsatisfactory manner. The lack of storage stability, which allows mixing of the components only directly before the preparation, the lack of tolerance towards functionalized cyclic olefins and the need to use two components as the catalyst system have been found to be particular disadvantages. There is therefore a need to provide a process, which is improved from the industrial, economic and ecological aspect and is generally usable, for the preparation of polymers from cyclic olefins by photochemical ring-opening metathesis polymerization.

WO 93/13171 describes air- and water-stable one-component and two-component catalysts based on molybdenum and tungsten compounds containing carbonyl groups and ruthenium and osmium compounds having at least one polyene ligand for thermal metathesis polymerization and a photoactivated metathesis polymerization of tight cycloolefins, in particular norbornene and norbornene derivatives. Other polycyclic cycloolefins—in particular non-fused polycyclic cycloolefins, are not mentioned. The one-component catalysts of ruthenium compounds used, specifically $[(C_6H_6)Ru(CH_3CN)_2Cl]^+PF_6^-$ and $[Ru(cumene)Cl_2]_2$ can indeed be activated by UV irradiation; however, the storage stability of the compositions with norbornene are [sic] completely inadequate. These catalysts are capable of replacing the known two-component catalysts only inadequately.

Petasis and Fu [Petasis, N. A., Fu, D., J. Am. Chem. Soc. 115:7208–7214 (1993)] describe the thermal ring-opening metathesis polymerization of norbornene using biscyclopentadienyl-bis(trimethylsilyl)methyl-titanium(IV) as a thermally active catalyst. No photochemical activity is mentioned.

It has been found that compositions of tight cycloolefins and a one-component catalyst can be polymerized photochemically if the composition comprises a niobium(V) or tantalum(V) compound in which at least two optionally substituted alkyl groups are bonded to the metal, the substituent containing no hydrogen in the α-position. Surprisingly, these thermally stable compounds have proved to be active catalysts for photo-induced ring-opening metathesis polymerization, the storage stability of mixtures of cycloolefins and the niobium or tantalum compounds being retained in spite of the photochemical reactivity.

It has furthermore been found, surprisingly, that the catalysts mentioned already act as thermal catalysts, after a short irradiation, in the presence of cycloolefins, so that photochemical and thermal polymerization can be used in combination.

The present invention relates to a process for the photocatalytic polymerization of a cyclic olefin or at least two different cyclic olefins in the presence of a metal compound as catalyst, which comprises carrying out a photochemical ring-opening metathesis polymerization in the presence of a catalytic amount of at least one heat-stable niobium(V) or tantalum(V) compound which contains at least two methyl groups or two monosubstituted methyl groups bound to the metal, the substituent containing no hydrogen atom in the α-position.

The remaining valencies of the niobium and tantalum atom are preferably satisfied by heat-stable neutral ligands, which are known in large numbers. The number of neutral ligands may even exceed the stoichiometrically possible number (solvates).

The cyclic olefins can be monocyclic or polycyclic fused and/or bridged ring systems, for example having 2 to 4 rings, which are unsubstituted or substituted and can contain heteroatoms, for example O, S, N or Si, in one or more rings and/or fused aromatic or heteroaromatic rings, for example o-phenylene, o-naphthylene, o-pyridylene or o-pyrimidinylene. The individual cyclic rings can contain 3 to 16, preferably 3 to 12, and particularly preferably 3 to 8, ring members. The cyclic olefins can contain further non-aromatic double bonds, depending on the ring size, preferably 2 to 4 such additional double bonds. The substituents on the ring are those which are inert, i.e. which do not impair the chemical stability and heat stability of the niobium and tantalum compounds. The cycloolefins are tight rings or ring systems.

Heat stability in the context of the invention means that the photocatalytically active niobium(V) or tantalum(V) compounds do not form active species for the ring-opening metathesis polymerization when heated. The catalyst can initiate no ring-opening metathesis polymerization, for example, at room temperature to slightly elevated temperature, for example +40° C., in the course of weeks with exclusion of light. During this period only an insignificant amount of monomer (less than 0.2% by weight) is reacted. The heat stability can be determined, for example, by storing a toluene solution containing 20% by weight of monomer and 0.33% by weight of niobium(V) or tantalum (V) catalyst in the dark at 50° C. for 96 hours and any amount of polymer formed, which can be detected by the build-up in viscosity and can be determined quantitatively by precipitation in a precipitant, for example ethanol, filtration and drying, being not more than 0.5% by weight, and preferably not more than 0.2% by weight.

If the cyclic olefins contain more than one double bond, for example 2 to 4 double bonds, crosslinked polymers can also be formed, depending on the reaction conditions, the monomer chosen and the amount of catalyst.

In a preferred embodiment of the process according to the invention, the cycloolefins are those of the formula I

(I)

in which $Q_1$ is a radical having at least one carbon atom which, together with the —CH=$CQ_2$— group, forms an at least 3-membered alicyclic ring which contains, if desired, one or more heteroatoms chosen from the group consisting of silicon, phosphorus, oxygen, nitrogen and sulfur; and which is unsubstituted or substituted by halogen, =O, —CN, —$NO_2$, $R_1R_2R_3$Si—(O)$_u$—, —COOM, —$SO_3$M, —$PO_3$M, —COO($M_1$)$_{1/2}$, —$SO_3(M_1)_{1/2}$, —$PO_3(M_1)_{1/2}$, $C_1$–$C_{20}$alkyl, $C_1$–$C_{20}$hydroxyalkyl, $C_1$–$C_{20}$haloalkyl, $C_1$–$C_6$cyanoalkyl, $C_3$–$C_8$cycloalkyl, $C_6$–$C_{16}$aryl, $C_7$–$C_{16}$aralkyl, $C_3$–$C_6$heterocycloalkyl, $C_3$–$C_{16}$heteroaryl, $C_4$–$C_{16}$heteroaralkyl or $R_4$—X—; or in which two adjacent C atoms are substituted by —CO—O—CO— or —CO—$NR_5$—CO—; or in which, if desired, an alicyclic, aromatic or heteroaromatic ring, which is unsubstituted or substituted by halogen, —CN, —$NO_2$, $R_6R_7R_8$Si—(O)$_u$—, —COOM, —$SO_3$M, —$PO_3$M, —COO($M_1$)$_{1/2}$, —$SO_3(M_1)_{1/2}$, —$PO_3(M_1)_{1/2}$, $C_1$–$C_{20}$alkyl, $C_1$–$C_{20}$haloalkyl, $C_1$–$C_{20}$hydroxyalkyl, $C_1$–$C_6$cyanoalkyl, $C_3$–$C_8$cycloalkyl, $C_6$–$C_{16}$aryl, $C_7$–$C_{16}$aralkyl, $C_3$–$C_6$heterocycloalkyl, $C_3$–$C_{16}$heteroaryl, $C_4$–$C_{16}$heteroaralkyl or $R_{13}$—$X_1$—, is fused onto adjacent carbon atoms of the alicyclic ring;

X and $X_1$ independently of one another are —O—, —S—, —CO—, —SO—, —$SO_2$—, —O—C(O)—, —C(O)—O—, —C(O)—$NR_5$—, —$NR_{10}$—C(O)—, —$SO_2$—O— or —O—$SO_2$—;

$R_1$, $R_2$ and $R_3$ independently of one another are $C_1$–$C_{12}$alkyl, $C_1$–$C_{12}$perfluoroalkyl, phenyl or benzyl;

$R_4$ and $R_{13}$ independently of one another are $C_1$–$C_{20}$alkyl, $C_1$–$C_{20}$haloalkyl, $C_1$–$C_{20}$hydroxyalkyl, $C_3$–$C_8$cycloalkyl, $C_6$–$C_{16}$aryl or $C_7$–$C_{16}$aralkyl;

$R_5$ and $R_{10}$ independently of one another are hydrogen, $C_1$–$C_{12}$alkyl, phenyl or benzyl, the alkyl groups in turn being unsubstituted or substituted by $C_1$–$C_{12}$alkoxy or $C_3$–$C_8$cycloalkyl;

$R_6$, $R_7$ and $R_8$ independently of one another are $C_1$–$C_{12}$alkyl, $C_1$–$C_{12}$perfluoroalkyl, phenyl or benzyl;

M is an alkali metal and $M_1$ is an alkaline earth metal; and u is 0 or 1;

and in which the alicyclic ring formed with $Q_1$ contains, if desired, further non-aromatic double bonds;

$Q_2$ is hydrogen, $C_1$–$C_{20}$alkyl, $C_1$–$C_{20}$haloalkyl, $C_1$–$C_{12}$alkoxy, halogen, —CN or $R_{11}$—$X_2$—;

$R_{11}$ is $C_1$–$C_{20}$alkyl, $C_1$–$C_{20}$haloalkyl, $C_1$–$C_{20}$hydroxyalkyl, $C_3$–$C_8$cycloalkyl, $C_6$–$C_{16}$aryl or $C_7$–$C_{16}$aralkyl;

$X_2$ is —C(O)—O— or —C(O)—$NR_{12}$—;

$R_{12}$ is hydrogen, $C_1$–$C_{12}$alkyl, phenyl or benzyl;

and in which the abovementioned cycloalkyl, heterocycloalkyl, aryl, heteroaryl, aralkyl and heteroaralkyl groups are unsubstituted or substituted by $C_1$–$C_{12}$alkyl, $C_1$–$C_{12}$alkoxy, —$NO_2$, —CN or halogen, and in which the heteroatoms of the abovementioned heterocycloalkyl, heteroaryl and heteroaralkyl groups are chosen from the group consisting of —O—, —S—, —$NR_9$— and —N=; and $R_9$ is hydrogen, $C_1$–$C_{12}$alkyl, phenyl or benzyl.

Fused alicyclic rings preferably comprise 3 to 8, particularly preferably 4 to 7 and especially preferably 5 or 6 ring C atoms.

If an asymmetric centre is present in the compounds of the formula I, this means that the compounds can occur in optically isomeric forms. Some compounds of the formula I may occur in tautomeric forms (for example keto-enol tautomerism). If an aliphatic C=C double bond is present, geometric isomerism (E-form and Z-form) can also occur. In addition, exo-endo configurations are also possible. Formula I thus comprises all possible stereoisomers which exist in the form of enantiomers, tautomers, diastereomers, E/Z isomers or mixtures thereof.

In the definition of the substituents, the alkyl, alkenyl and alkynyl groups can be straight-chain or branched. The same also applies to the or each alkyl moiety of alkoxy, alkylthio, alkoxycarbonyl and other alkyl-containing groups. These alkyl groups preferably contain 1 to 12, more preferably 1 to 8, and particularly preferably 1 to 4 C atoms. These alkenyl and alkynyl groups preferably contain 2 to 12, more preferably 2 to 8, and particularly preferably 2 to 4 C atoms.

Alkyl includes, for example, methyl, ethyl, isopropyl, n-propyl, n-butyl, isobutyl, sec-butyl, tert-butyl and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Hydroxyalkyl includes, for example, hydroxymethyl, hydroxyethyl, 1-hydroxyisopropyl, 1-hydroxy-n-propyl, 2-hydroxy-n-butyl, 1-hydroxy-iso-butyl, 1-hydroxy-sec-butyl, 1-hydroxy-tert-butyl and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Haloalkyl includes, for example, fluoromethyl, difluoromethyl, trifluoromethyl, chloromethyl, dichloromethyl, trichloromethyl, 2,2,2-trifluoroethyl, 2-fluoroethyl, 2-chloroethyl, 2,2,2-trichloroethyl and halogenated, in particular fluorinated or chlorinated, alkanes, such as, for example, the isopropyl, n-propyl, n-butyl, iso-butyl, sec-butyl, tert-butyl and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Alkenyl includes, for example, propenyl, isopropenyl, 2-butenyl, 3-butenyl, isobutenyl, n-penta-2,4-dienyl, 3-methyl-but-2-enyl, n-oct-2-enyl, n-dodec-2-enyl, iso-dodecenyl, n-octadec-2-enyl and n-octadec-4-enyl.

Cycloalkyl is preferably $C_5$–$C_8$cycloalkyl, in particular $C_5$- or $C_6$cycloalkyl. Some examples are cyclopropyl, dimethylcyclopropyl, cyclobutyl, cyclopentyl, methylcyclopentyl, cyclohexyl, cycloheptyl and cyclooctyl.

Cyanoalkyl includes, for example, cyanomethyl (methylnitrile), cyanoethyl (ethylnitrile), 1-cyanoisopropyl, 1-cyano-n-propyl, 2-cyano-n-butyl, 1-cyano-iso-butyl, 1-cyano-sec-butyl, 1-cyano-tert-butyl and the various isomeric cyanopentyl and -hexyl radicals.

Aralkyl preferably contains 7 to 12 C atoms, and particularly preferably 7 to 10 C atoms. It can be, for example, benzyl, phenethyl, 3-phenylpropyl, α-methylbenzyl, phenbutyl or α,α-dimethylbenzyl.

Aryl preferably contains 6 to 10 C atoms. It can be, for example, phenyl, pentalene, indene, naphthalene, azulene or anthracene.

Heteroaryl preferably contains 4 or 5 C atoms and one or two heteroatoms from the group consisting of O, and N. It can be, for example, pyrrole, furan, thiophene, oxazole, thioazole, pyridine, pyrazine, pyrimidine, pyridazine, indole, purine or quinoline.

Heterocycloalkyl preferably contains 4 or 5 C atoms and one or two heteroatoms from the group consisting of O, S and N. It can be, for example, oxirane, azirine, 1,2-oxathiolane, pyrazoline, pyrrolidine, piperidine, piperazine, morpholine, tetrahydrofuran or tetrahydrothiophene.

Alkoxy is, for example, methoxy, ethoxy, propyloxy, i-propyloxy, n-butyloxy, i-butyloxy, sec-butyloxy and t-butyloxy.

Alkali metal in the context of the present invention is to be understood as meaning lithium, sodium, potassium, rubidium and caesium, in particular lithium, sodium and potassium.

Alkaline earth metal in the context of the present invention is to be understood as meaning beryllium, magnesium, calcium, strontium and barium, in particular magnesium and calcium.

In the above definitions, halogen is to be understood as meaning fluorine, chlorine, bromine and iodine, preferably fluorine, chlorine and bromine.

Particularly suitable compounds of the formula I for the process according to the invention are those in which $Q_2$ is hydrogen.

Compounds of the formula I which are furthermore preferred for the polymerization are those in which the alicyclic ring which $Q_1$ forms together with the —CH═$CQ_2$— group has 3 to 16, more preferably 3 to 12, and particularly preferably 3 to 8 ring atoms, it being possible for the ring system to be a monocyclic, bicyclic, tricyclic or tetracyclic ring system.

The process according to the invention can be carried out particularly advantageously with those compounds of the formula I in which $Q_1$ is a radical having at least one carbon atom which, together with the —CH═$CQ_2$— group, forms a 3- to 20-membered alicyclic ring which contains, if desired, one or more heteroatoms chosen from the group consisting of silicon, oxygen, nitrogen and sulfur; and which is unsubstituted or substituted by halogen, ═O, —CN, —$NO_2$, $R_1R_2R_3$Si—$(O)_u$—, —COOM, —$SO_3$M, —$PO_3$M, —COO$(M)_{1/2}$, —$SO_3(M_1)_{1/2}$, —$PO_3(M_1)_{1/2}$, $C_1$–$C_{12}$alkyl, $C_1$–$C_{12}$haloalkyl, $C_1$–$C_{12}$hydroxyalkyl, $C_1$–$C_4$cyanoalkyl, $C_3$–$C_6$cycloalkyl, $C_6$–$C_{12}$aryl, $C_7$–$C_{12}$aralkyl, $C_3$–$C_6$heterocycloalkyl, $C_3$–$C_{12}$heteroaryl, $C_4$–$C_{12}$heteroaralkyl or $R_4$—X—; or in which two adjacent C atoms in this radical $Q_1$ are substituted by —CO—O—CO— or —CO—$NR_5$—CO—; or in which, if desired, an alicyclic, aromatic or heteroaromatic ring which is unsubstituted or substituted by halogen, —CN, —$NO_2$, $R_6R_7R_8$Si—, —COOM, —$SO_3$M, —$PO_3$M, —COO$(M_1)_{1/2}$, —$SO_3(M_1)_{1/2}$, —$PO_3(M_1)_{1/2}$, $C_1$–$C_{12}$alkyl, $C_1$–$C_{12}$haloalkyl, $C_1$–$C_{12}$hydroxyalkyl, $C_1$–$C_4$cyanoalkyl, $C_3$–$C_6$cycloalkyl, $C_6$–$C_{12}$aryl, $C_7$–$C_{12}$aralkyl, $C_3$–$C_6$heterocycloalkyl, $C_3$–$C_{12}$heteroaryl, $C_4$–$C_{12}$heteroaralkyl or $R_{13}$—$X_1$— is fused onto adjacent carbon atoms;

X and $X_1$ independently of one another are —O—, —S—, —CO—, —SO—, —$SO_2$—, —O—C(O)—, —C(O)—O—, —C(O)—$NR_5$—, —$NR_{10}$—C(O)—, —$SO_2$—O— or —O—$SO_2$—;

$R_1$, $R_2$ and $R_3$ independently of one another are $C_1$–$C_6$alkyl, $C_1$–$C_6$perfluoroalkyl, phenyl or benzyl;

M is an alkali metal and $M_1$ is an alkaline earth metal;

$R_4$ and $R_{13}$ independently of one another are $C_1$–$C_{12}$alkyl, $C_1$–$C_{12}$haloalkyl, $C_1$–$C_{12}$hydroxyalkyl, $C_3$–$C_8$cycloalkyl, $C_6$–$C_{12}$aryl or $C_7$–$C_{12}$aralkyl;

$R_5$ and $R_{10}$ independently of one another are hydrogen, $C_1$–$C_6$alkyl, phenyl or benzyl, the alkyl groups in turn being unsubstituted or substituted by $C_1$–$C_6$alkoxy or $C_3$–$C_6$cycloalkyl;

$R_6$, $R_7$ and $R_8$ independently of one another are $C_1$–$C_6$alkyl, $C_1$–$C_6$perfluoroalkyl, phenyl or benzyl;

u is 0 or 1;

and in which the alicyclic ring formed with $Q_1$ contains, if desired, further non-aromatic double bonds;

$Q_2$ is hydrogen, $C_1$–$C_{12}$alkyl, $C_1$–$C_{12}$haloalkyl, $C_1$–$C_6$alkoxy, halogen, —CN or $R_{11}$—$X_2$—;

$R_{11}$ is $C_1$–$C_{12}$alkyl, $C_1$–$C_{12}$haloalkyl, $C_1$–$C_{12}$hydroxyalkyl, $C_3$–$C_6$cycloalkyl, $C_6$–$C_{12}$aryl or $C_7$–$C_{12}$aralkyl;

$X_2$ is —C(O)—O— or —C(O)—$NR_{12}$—; and $R_{12}$ is hydrogen, $C_1$–$C_6$alkyl, phenyl or benzyl;

in which the cycloalkyl, heterocycloalkyl, aryl, heteroaryl, aralkyl and heteroaralkyl groups are unsubstituted or substituted by $C_1$–$C_6$alkyl, $C_1$–$C_6$alkoxy, —$NO_2$, —CN or halogen, and in which the heteroatoms of the heterocycloalkyl, heteroaryl and heteroaralkyl groups are chosen from the group consisting of —O—, —S—, —$NR_9$— and —N═; and $R_9$ is hydrogen, $C_1$–$C_6$alkyl, phenyl or benzyl.

From this group, preferred compounds of the formula I are those in which $Q_1$ is a radical having at least one carbon atom which, together with the —CH=C$Q_2$— group, forms a 3- to 10-membered alicyclic ring which contains, if desired, a heteroatom chosen from the group consisting of silicon, oxygen, nitrogen and sulfur and which is unsubstituted or substituted by halogen, —CN, —NO$_2$, $R_1R_2R_3$Si—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, $C_1$–$C_6$alkyl, $C_1$–$C_6$haloalkyl, $C_1$–$C_6$hydroxyalkyl, $C_1$–$C_4$cyanoalkyl, $C_3$–$C_6$cycloalkyl, phenyl, benzyl or $R_4$–X—; or in which, if desired, an alicyclic, aromatic or heteroaromatic ring which is unsubstituted or substituted by halogen, —CN, —NO$_2$, $R_6R_7R_8$Si—, —COOM, —SO$_3$M, —PO$_3$M, —COO(M)$_{1/2}$, —So$_3$(M$_1$)$_{1/2}$, —PO$_3$(M$_1$)$_1$2, $C_1$–$C_6$alkyl, $C_1$–$C_6$haloalkyl, $C_1$–$C_6$hydroxyalkyl, $C_1$–$C_4$cyanoalkyl, $C_3$–$C_6$cycloalkyl, phenyl, benzyl or $R_{13}$—$X_1$- is fused onto adjacent carbon atoms;

$R_1$, $R_2$ and $R_3$ independently of one another are $C_1$–$C_4$alkyl, $C_1$–$C_4$perfluoroalkyl, phenyl or benzyl;

M is an alkali metal and $M_1$ is an alkaline earth metal;

$R_4$ and $R_{13}$ independently of one another are $C_1$–$C_6$alkyl, $C_1$–$C_6$haloalkyl, $C_1$–$C_6$hydroxyalkyl or $C_3$–$C_6$cycloalkyl;

X and $X_1$ independently of one another are —O—, —S—, —CO—, —SO— or —SO$_2$—;

$R_6$, $R_7$ and $R_8$ independently of one another are $C_1$–$C_4$alkyl, $C_1$–$C_4$perfluoroalkyl, phenyl or benzyl; and $Q_2$ is hydrogen.

The process according to the invention is particularly suitable for the polymerization of norbornene and norbornene derivatives. Particularly preferred norbornene derivatives are those of either the formula II

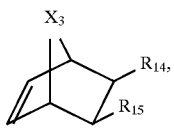
(II)

in which $X_3$ is —CHR$_{16}$—, oxygen or sulfur;

$R_{14}$ and $R_{15}$ independently of one another are hydrogen, —CN, trifluoromethyl, (CH$_3$)$_3$Si—O—, (CH$_3$)$_3$Si— or —COOR$_{17}$; and $R_{16}$ and $R_{17}$ independently of one another are hydrogen, $C_1$–$C_{12}$alkyl, phenyl or benzyl;

or of the formula III

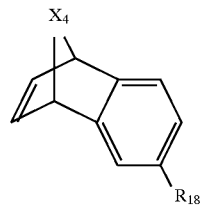
(III)

in which $X_4$ is —CHR$_{19}$—, oxygen or sulfur;

$R_{19}$ is hydrogen, $C_1$–$C_{12}$alkyl, phenyl or benzyl; and $R_{18}$ is hydrogen, $C_1$–$C_6$alkyl or halogen;

or of the formula IV

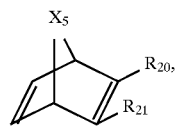
(IV)

in which $X_5$ is —CHR$_{22}$—, oxygen or sulfur;

$R_{22}$ is hydrogen, $C_1$–$C_{12}$alkyl, phenyl or benzyl;

$R_{20}$ and $R_{21}$ independently of one another are hydrogen, CN, trifluoromethyl, (CH$_3$)$_3$Si—O—, (CH$_3$)$_3$Si— or —COOR$_{23}$; and $R_{23}$ is hydrogen, $C_1$–$C_{12}$alkyl, phenyl or benzyl;

or of the formula V

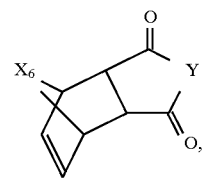
(V)

in which $X_6$ is —CHR$_{24}$—, oxygen or sulfur;

$R_{24}$ is hydrogen, $C_1$–$C_{12}$alkyl, phenyl or benzyl;

Y is oxygen or

and $R_{25}$ is hydrogen, methyl, ethyl or phenyl.

The following compounds of the formula I are particularly suitable for the polymerization process according to the invention, bi- and polycyclic systems being accessible through Diels-Alder reactions:

(1)

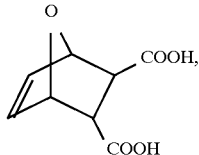
(2)

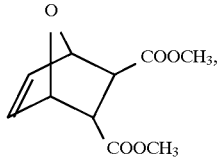
(3)

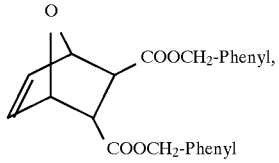
(4)

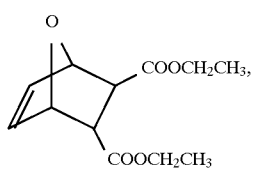 (5)
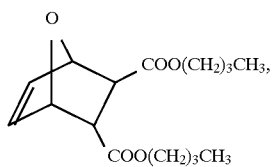 (6)
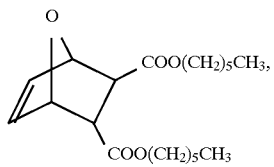 (7)
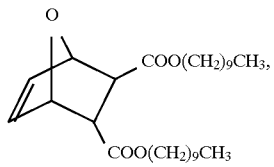 (8)
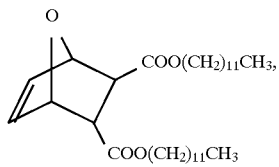 (9)
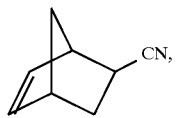 (10)
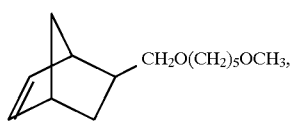 (11)
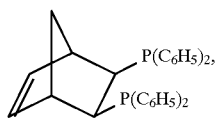 (12)
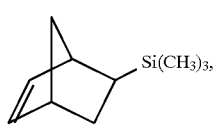 (13)
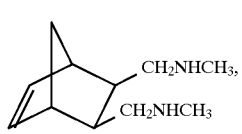 (14)
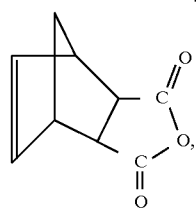 (15)
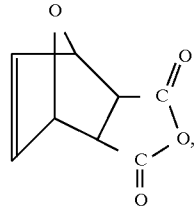 (16)
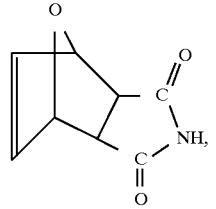 (17)
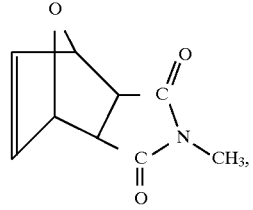 (18)
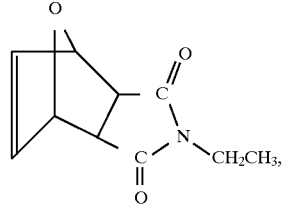 (19)
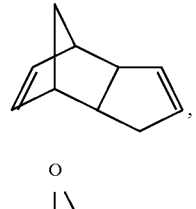 (20)
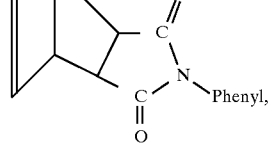 (21)
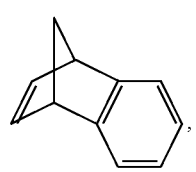 (22)

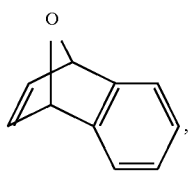 (23)
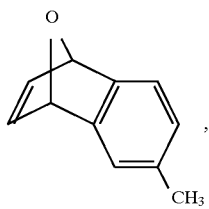 (24)
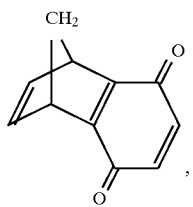 (25)
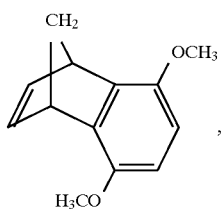 (26)
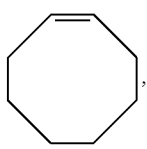 (27)
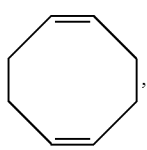 (28)
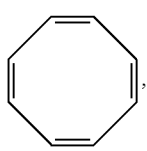 (29)
 (30)
 (31)
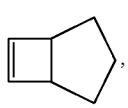 (32)
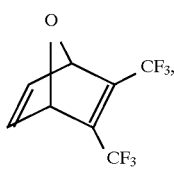 (33)
 (34)
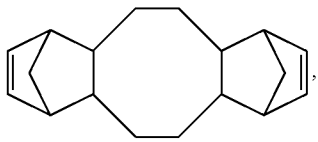 (35)
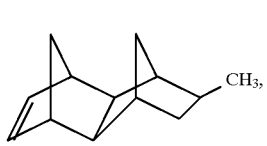 (36)
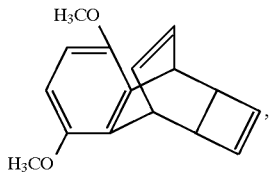 (37)
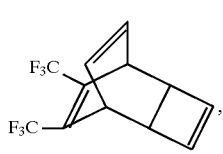 (38)
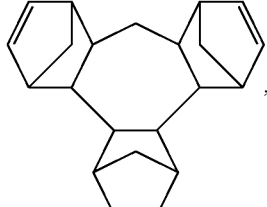 (39)
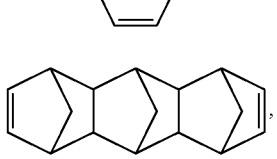 (40)
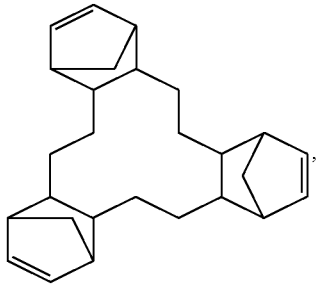 (41)

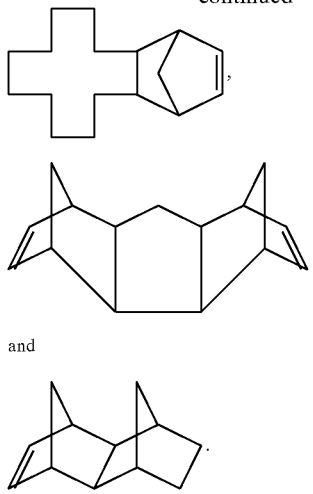

The niobium(V) and tantalum(V) compounds to be used according to the invention contain a metal atom. At least two, preferably two to five and especially two to three, methyl groups or monosubstituted methyl groups are bound to the metal as a ligand. This ligand preferably has the formula VII

    (VII), in which R is H, —CF$_3$, —CR$_{26}$R$_{27}$R$_{28}$, —SiR$_{29}$R$_{30}$R$_{31}$, C$_6$–C$_{16}$aryl which is unsubstituted or substituted by C$_1$–C$_6$alkyl or C$_1$–C$_6$alkoxy, or C$_4$–C$_{15}$heteroaryl which has 1 to 3 heteroatoms from the group consisting of O, S and N; and R$_{26}$, R$_{27}$ and R$_{28}$ independently of one another are C$_1$–C$_{10}$alkyl, which is unsubstituted or substituted by C$_1$–C$_{10}$alkoxy, or R$_{26}$ and R$_{27}$ have this meaning and R$_{28}$ is C$_6$–C$_{10}$aryl or C$_4$–C$_9$heteroaryl, which is unsubstituted or by C$_1$–C$_6$alkyl or C$_1$–C$_6$alkoxy; and R$_{29}$, R$_{30}$ and R$_{31}$ independently of one another are C$_1$–C$_6$alkyl, C$_5$- or C$_6$-cycloalkyl, or phenyl or benzyl which are unsubstituted or substituted by C$_1$–C$_6$alkyl or C$_1$–C$_6$alkoxy.

Alkyl R$_{26}$ to R$_{31}$ can be linear or branched and can contain preferably 1 to 8, and particularly preferably 1 to 4 C atoms. Aryl R$_{28}$ to R$_{31}$ is preferably phenyl or naphthyl.

Aryl R in formula VII is preferably phenyl or naphthyl. Heteroaryl R in formula VII is preferably pyridinyl, furanyl, thiophenyl or pyrrolyl.

Preferred substituents for R$_{26}$ to R$_{31}$, in the context of the definitions, are methyl, ethyl, methoxy and ethoxy. Examples of the radicals R$_{26}$ to R$_{31}$ have been given above under the compounds of the formula I.

In a preferred embodiment, the group R in formula VII is H, C(CH$_3$)$_3$, —C(CH$_3$)$_2$C$_6$H$_5$, phenyl which is unsubstituted or substituted by methyl, ethyl, methoxy or ethoxy, —CF$_3$, or —Si(CH$_3$)$_3$.

The other valencies of the niobium and tantalum are preferably satisfied with heat-stable neutral ligands, the definition of heat stability having been given above. These are advantageously identical or different ligands from the group consisting of =O, =N—R$_{33}$, secondary amines having 2 to 18 C atoms, R$_{32}$O—, R$_{32}$S—, halogen, cyclopentadienyl, bridged biscyclopentadienyl, tridentate monoanionic ligands and neutral ligands, for example ethers, nitriles, CO and tertiary phosphines and amines, in which the R$_{32}$ independently of one another are linear or branched C$_1$–C$_{18}$alkyl which is unsubstituted or substituted by C$_1$–C$_6$alkoxy or halogen, C$_5$- or C$_6$cycloalkyl which is unsubstituted or substituted by C$_1$–C$_6$alkyl, C$_1$–C$_6$alkoxy or halogen, phenyl which is unsubstituted or substituted by C$_1$–C$_6$alkyl, C$_1$–C$_6$alkoxy, C$_1$–C$_6$alkoxymethyl, C$_1$–C$_6$alkoxyethyl or halogen, or benzyl or phenylethyl which are unsubstituted or substituted by C$_1$–C$_6$alkyl, C$_1$–C$_6$alkoxy, C$_1$–C$_6$alkoxymethyl, C$_1$–C$_6$alkoxyethyl or halogen; and R$_{33}$ is linear or branched C$_1$–C$_{18}$alkyl which is unsubstituted or substituted by C$_1$–C$_6$alkoxy, C$_5$- or C$_6$cycloalkyl which is unsubstituted or substituted by C$_1$–C$_6$alkyl, C$_1$–C$_6$alkoxy or halogen, phenyl which is unsubstituted or substituted by C$_1$–C$_6$alkyl, C$_1$–C$_6$alkoxy, C$_1$–C$_6$alkoxymethyl, C$_1$–C$_6$alkoxyethyl, di(C$_1$–C$_6$alkyl) amino, di(C$_1$–C$_6$alkyl)amino-C$_1$–C$_3$alkyl or halogen, or benzyl or phenylethyl which are unsubstituted or substituted by C$_1$–C$_6$alkyl, C$_1$–C$_6$alkoxy, C$_1$–C$_6$alkoxymethyl-, C$_1$–C$_6$alkoxyethyl- or halogen.

Secondary amines are preferably those of the formula R$_{34}$R$_{35}$N—, in which R$_{34}$ and R$_{35}$ independently of one another are linear or branched C$_1$–C$_{18}$alkyl, C$_5$- or C$_6$cycloalkyl, benzyl or phenylethyl which are unsubstituted or substituted by C$_1$–C$_6$alkoxy or halogen, or (C$_1$–C$_6$alkyl)$_3$Si; or together are tetramethylene, pentamethylene or 3-oxapentane-1,5-diyl. The alkyl contains preferably 1 to 12, and particularly preferably 1 to 6 C atoms. Some examples are dimethyl-, diethyl-, di-n-propyl-, di-i-propyl-, di-n-butyl-, methylethyl-, dibenzyl-, benzylmethyl-, diphenyl-, phenylmethylamino and di(trimethylsilyl)amino.

Halogen as a further ligand on the metal atoms or as a substituent is preferably fluorine or chlorine, and particularly preferably chlorine.

The cyclopentadienyl can be unsubstituted or substituted by one to five C$_1$–C$_4$alkyl, in particular methyl, or —Si(C$_1$–C$_4$alkyl), in particular —Si(CH$_3$)$_3$. Bridged cyclopentadienyls are, in particular, those of the formula R$_{36}$—A—R$_{36}$, in which R$_{36}$ is cyclopentadienyl which is unsubstituted or substituted by one to five C$_1$–C$_4$alkyl, in particular methyl, or —Si(C$_1$–C$_4$alkyl), in particular —Si(CH$_3$)$_3$, and A is —CH$_2$—, —CH$_2$—CH$_2$—, —Si(CH$_3$)$_2$—, Si(CH$_3$)$_2$—Si(CH$_3$)$_2$— or —Si(CH$_3$)$_2$—O—Si(CH$_3$)$_2$—.

Ethers as neutral ligands can be dialkyl ethers having 2 to 8 C atoms or cyclic ethers having 5 or 6 ring members. Some examples are diethyl ether, methyl ethyl ether, diethyl ether, di-n-propyl ether, di-i-propyl ether, di-n-butyl ether, ethylene glycol dimethyl ether, tetrahydrofuran and dioxane.

Nitriles as neutral ligands can be aliphatic or aromatic nitriles having 1 to 12, preferably 1 to 8 C atoms. Some examples are acetonitrile, propionitrile, butylnitrile, benzonitrile and benzylnitrile.

Tertiary amines and phosphines as neutral ligands can be those having 3 to 24, preferably 3 to 18 C atoms. Some examples are trimethylamine and -phosphine, triethylamine and -phosphine, tri-n-propylamine and -phosphine, tri-n-butylamine and -phosphine, triphenylamine and -phosphine, tricyclohexylamine and -phosphine, phenyldimethylamine and -phosphine, benzyldimethylamine and -phosphine, 3,5-dimethylphenyl-dimethylamine and -phosphine.

The tridentate monoanionic ligands can be, for example, hydro(trispyrazol-1-yl)borates or alkyl(trispyrazol-1-yl) borates, which are unsubstituted or substituted by one to three C$_1$–C$_4$alkyl [cf. Trofimenko, S., Chem. Rev., 93:943–980 (1993)], or [C$_5$(R'$_5$)Co(R$_{37}$R$_{38}$P=O)$_3$]$^\ominus$, in which R' is H or methyl and R$_{37}$ and R$_{38}$ independently of another are C$_1$–C$_4$alkyl, C$_1$–C$_4$alkoxy or phenyl [cf. Klaui, W., Angew. Chem. 102:661–670 (1990)].

Halogen as a substituent for the radicals R$_{32}$ and R$_{33}$ is preferably fluorine and particularly preferably chlorine. The substituents alkyl, alkoxy or alkoxy in the alkoxymethyl or -ethyl preferably contain 1 to 4, and particularly 1 or 2 C atoms. Examples are methyl, ethyl, n- and i-propyl, n—, i- and t-butyl, methoxy, ethoxy, n- and i-propyloxy and n-, i- and t-butyloxy.

Alkyl $R_{32}$ and $R_{33}$ preferably contain 1 to 12, particularly preferably 1 to 8, and especially preferably 1 to 4 C atoms. It is preferably branched alkyl. Some examples of $R_{32}$ are methoxy, ethoxy, n- and i-propyloxy, n-, i- and t-butyloxy, hexafluoro-i-propyloxy and hexa- and perfluorobutyloxy.

Some examples of substituted phenyl and benzyl for $R_{32}$ and $R_{33}$ are p-methylphenyl or benzyl [sic], p-fluoro- or p-chlorophenyl or -benzyl, p-ethylphenyl or -benzyl, p-n- or i-propylphenyl or -benzyl, p-i-butylphenyl or -benzyl, 3-methylphenyl or -benzyl, 3-i-propylphenyl or -benzyl, 3,5-dimethylphenyl or -benzyl, 3,5-i-propylphenyl or -benzyl, 3,5-n- or -t-butylphenyl and -benzyl. $R_{33}$ is particularly preferably phenyl which is unsubstituted or substituted by $C_1$-$C_4$alkyl or $C_1$-$C_4$alkoxy.

In a preferred embodiment, the niobium and tantalum compounds have, in particular, the formula VIII

in which

Me is Nb(V) or Ta(V), at least two, preferably two or three, of the radicals $R_{39}$ to $R_{43}$ are a radical —$CH_2$—R of the formula VII, in which R is H, —$CF_3$, —$CR_{26}R_{27}R_{28}$, —$SiR_{29}R_{30}R_{31}$, $C_6$–$C_{16}$aryl which is unsubstituted or substituted by $C_1$–$C_6$alkyl or $C_1$–$C_6$alkoxy, or $C_4$–$C_{15}$heteroaryl with 1 to 3 heteroatoms from the group consisting of O, S and N;

$R_{26}$, $R_{27}$ and $R_{28}$ independently of one another are $C_1$–$C_{10}$alkyl, which is unsubstituted or substituted by $C_1$–$C_{10}$alkoxy, or $R_{26}$ and $R_{27}$ have this meaning and $R_{28}$ is $C_6$–$C_{10}$aryl or $C_4$–$C_9$heteroaryl, which is unsubstituted or substituted by $C_1$–$C_6$alkyl or $C_1$–$C_6$alkoxy; and $R_{29}$, $R_{30}$ and $R_{31}$ independently of one another are $C_1$–$C_6$alkyl, $C_5$- or $C_6$cycloalkyl, or phenyl or benzyl which are unsubstituted or substituted by $C_1$–$C_6$alkyl or $C_1$–$C_6$alkoxy; two of the other radicals of $R_{39}$ to $R_{43}$ together are =O or =N—$R_{33}$, and $R_{33}$ is linear or branched $C_1$–$C_{18}$alkyl which is unsubstituted or substituted by $C_1$–$C_6$alkoxy, $C_5$- or $C_6$cycloalkyl which is unsubstituted or substituted by $C_1$–$C_6$alkyl, $C_1$–$C_6$alkoxy or halogen, phenyl which is unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl)amino-$C_1$–$C_3$alkyl or halogen, or benzyl or phenylethyl which are unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl)amino-$C_1$–$C_3$alkyl or halogen; and/or the other radicals of $R_{39}$ to $R_{43}$ independently of one another are secondary amino having 2 to 18 C atoms, $R_{32}$O— or $R_{32}$S—, halogen, cyclopentadienyl or bridged biscyclopentadienyl [sic] or a neutral ligand, in which the $R_{32}$ independently of one another are linear or branched $C_1$–$C_{18}$alkyl which is unsubstituted or substituted by $C_1$–$C_6$alkoxy or halogen, $C_5$- or $C_6$cycloalkyl which is unsubstituted or substituted by $C_1$–$C_6$alkyl, $C_1$–$C_6$alkoxy or halogen, phenyl which is unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl)-amino-$C_1$–$C_3$alkyl or halogen, or benzyl or phenylethyl which are unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl) amino, di($C_1$–$C_6$alkyl)amino-$C_1$–$C_3$alkyl or halogen.

The radicals R and $R_{26}$ to $R_{33}$ are as preferred above.

In a particularly preferred embodiment, the niobium and tantalum compounds used in the process according to the invention are those of the formula VIII in which
a) $R_{39}$ to $R_{43}$ are each a radical of the formula VII —$CH_2$—R, or
b) $R_{39}$ and $R_{40}$ are each a radical of the formula VII —$CH_2$—R, $R_{41}$ and $R_{42}$ together are the radical =N—$R_{33}$ and $R_{43}$ is unsubstituted or substituted cyclopentadienyl, $R_{32}$—O— or halogen, or
c) $R_{39}$, $R_{40}$ and $R_{41}$ are each a radical of the formula VII —$CH_2$—R and $R_{42}$ and $R_{43}$ together are the radical =N—$R_{33}$, or $R_{39}$, $R_{40}$, $R_{41}$ and $R_{42}$ are each a radical of the formula VII —$CH_2$—R and $R_{43}$ is unsubstituted or substituted cyclopentadienyl, $R_{32}$—O— or halogen, in which R, $R_{32}$ and $R_{33}$ are as defined above. R, $R_{32}$ and $R_{33}$ are as preferred above.

Niobium and tantalum compounds which are especially preferably used in the process according to the invention are those of the formulae IX, IXa or IXb

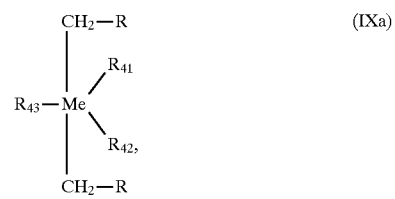

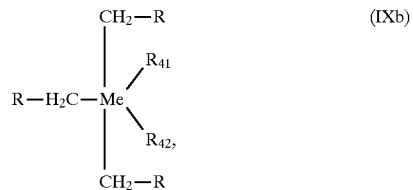

in which

Me is Nb(V) or Ta(V),

R is H, —$C(CH_3)_3$, —$C(CH_3)_2$—$C_6H_5$, —$C_6H_5$ or —Si($C_1$–$C_4$alkyl)$_3$, $R_{33}$ is phenyl or phenyl which is substituted by one to three $C_1$–$C_4$alkyl or $C_1$–$C_4$alkoxy, $R_{43}$ in formula IX is the group —$CH_2$—R or F, Cl, Br, linear or, in particular, branched $C_1$–$C_4$alkoxy which is unsubstituted or substituted by fluorine, phenyloxy which is unsubstituted or substituted by $C_1$–$C_4$alkyl or $C_1$–$C_4$alkoxy, or cyclopentadienyl which is unsubstituted or substituted by $C_1$–$C_4$alkyl;

$R_{41}$, $R_{42}$ and $R_{43}$ in formula IXa independently of one another are F, Cl, Br, linear or, in particular, branched $C_1$–$C_4$alkoxy which is unsubstituted or substituted by fluorine, phenyloxy which is unsubstituted or substituted by $C_1$–$C_4$alkyl or $C_1$–$C_4$alkoxy, or cyclopentadienyl which is unsubstituted or substituted by $C_1$–$C_4$alkyl; and $R_{41}$ and $R_{42}$ in formula IXb independently of one another are F, Cl, Br, linear or, in particular, branched $C_1$–$C_4$ alkoxy which is unsubstituted or substituted by fluorine, phenyloxy which is unsubstituted or substituted by $C_1$–$C_4$ alkyl or $C_1$–$C_4$ alkoxy, or cyclopentadienyl which is unsubstituted or substituted by $C_1$–$C_4$ alkyl. The alkoxy is particularly preferably branched alkoxy, which is unsubstituted or partly or completely substituted by F, for example i-propyloxy, i- and t-butyloxy, hexafluoropopyloxy [sic] and nonafluoropropyloxy.

Some examples of niobium(V) and tantalum(V) compounds are [Cp is cyclopentadienyl and Me is Nb(V) or Ta(V)]:

Me[CH$_2$Si(CH$_3$)$_3$]$_5$, Cp$_2$Me[(CH$_2$C(CH$_3$)$_2$—C$_6$H$_5$)]$_3$, Me(=N-2,6-dimethylC$_6$H$_3$)(CH$_3$)$_3$,
Me(=N—C$_6$H$_5$)[OC(CH$_3$)$_3$][(CH$_2$Si(CH$_3$)$_3$)]$_2$, Me(=N-2,6-diisopropylC$_6$H$_3$)[(CH$_2$—C$_6$H$_5$)]$_3$,
Me(=N—C$_6$H$_5$)[OCCH$_3$(CF$_3$)$_2$][(CH$_2$Si(CH$_3$)$_3$)]$_2$, CpMe[OCCH$_3$(CF$_3$)$_2$]$_2$[(CH$_2$—C$_6$H$_5$)]$_2$,
Me(=N-2,6-diisopropylC$_6$H$_3$)[(CH$_2$C(CH$_3$)$_2$—C$_6$H$_5$)]$_2$Cl, Cp$_2$Me(CH$_3$)$_2$[OCH(CH$_3$)$_2$],
Me(=N-2,6-dimethylC$_6$H$_3$)[(CH$_2$—C$_6$H$_5$)]$_3$, CpMe[OCH(CH$_3$)$_2$]$_2$[(CH$_2$Si(CH$_3$)$_3$)]$_2$,
Cp$_2$Me[(CH$_2$—C$_6$H$_5$)]$_3$, Me[CH$_2$Si(CH$_3$)$_3$]$_3$Cl$_2$, Me[CH$_2$Si(CH$_3$)$_3$]$_3$[OCH$_2$C(CH$_3$)$_3$]$_2$,
Cp$_2$Me[3,5-dimethylC$_6$H$_3$O)][(CH$_2$Si(CH$_3$)$_3$)]$_2$, Me(2,6-diisopropylphenyloxy)$_2$(CH$_3$)$_3$,
Cp$_2$Me(CH$_3$)$_3$, Me(2,6-dimethylphenyloxy)$_2$(CH$_3$)$_3$, Me[CH$_2$Si(CH$_3$)$_3$]$_3$[OCH(CH$_3$)]$_2$,
CpMe[OC(CH$_3$)$_3$]$_2$[(CH$_2$—C$_6$H$_5$)]$_2$, Cp$_2$Me[(CH$_2$Si(CH$_3$)$_3$)]$_3$.

The niobium and tantalum compounds to be used according to the invention are known or can be prepared by known and analogous processes starting from substituted or unsubstituted metal halides via Grignard reactions and/or substitution reactions [Schrock, R. R., Murdzeck, J. S., Bazan, G. C., Robbins, J., DiMare, M., O'Regan, M., J. Am. Chem. Soc., 112:3875–3886 (1990)].

The process according to the invention can be carried out in the presence of an inert solvent. A particular advantage of the process according to the invention is that, in the case of liquid monomers, the process can be carried out without using a solvent. Inert means that the choice of solvent depends on the reactivity of the niobium and tantalum compounds, for example that protic polar solvents are not used if substitution reactions, such as replacement of halogen by alkoxy, are to be expected.

Suitable inert solvents are, for example, protic polar and aprotic solvents, which can be used by themselves or in mixtures of at least two solvents. Examples are: ethers (dibutyl ether, tetrahydrofuran, dioxane, ethylene glycol monomethyl or dimethyl ether, ethylene glycol monoethyl or diethyl ether, diethylene glycol diethyl ether and triethylene glycol dimethyl ether), halogenated hydrocarbons (methylene chloride, chloroform, 1,2-dichloroethane, 1,1,1-trichloroethane and 1,1,2,2-tetrachloroethane), carboxylic acid esters and lactones (ethyl acetate, methyl propionate, ethyl benzoate, 2-methoxyethyl acetate, γ-butyrolactone, δ-valerolactone, pivalolactone), carboxylic acid amides and lactams (N,N-dimethylformamide, N,N-diethylformamide, N,N-dimethylacetamide, tetramethylurea, hexamethylphosphoric acid triamide, γ-butyrolactam, ε-caprolactam, N-methylpyrrolidone, N-acetylpyrrolidone, N-methylcaprolactam), sulfoxides (dimethyl sulfoxide), sulfones (dimethyl sulfone, diethyl sulfone, trimethylene sulfone, tetramethylene sulfone), tertiary amines (N-methylpiperidine, N-methylmorpholine), aliphatic and aromatic hydrocarbons, for example petrol ether, pentane, hexane, cyclohexane, methylcyclohexane, benzene or substituted benzenes (chlorobenzene, o-dichlorobenzene, 1,2,4-trichlorobenzene, nitrobenzene, toluene, xylene) and nitriles (acetonitrile, propionitrile, benzonitrile, phenylacetonitrile). Preferred solvents are aprotic polar and non-polar solvents.

Preferred solvents are aliphatic and aromatic hydrocarbons and mixtures of such solvents.

It is to be particularly emphasized that the compositions of a substituted or unsubstituted cycloolefin and catalyst which are employed according to the invention for the process are often insensitive to oxygen, which allows storage and a reaction procedure without an inert gas. However, exclusion of moisture, i.e. the use of dry reaction and storage conditions, is advisable.

The monomers of the formula I and catalysts employed for the process according to the invention can be stored either separately or together as a mixture, since the catalyst used has a particularly high stability. The mixture can be stored as the ready-to-use formulation before the photochemical polymerization, which is of advantage for application of the process according to the invention on a large industrial scale. Because of the high photosensitivity, especially in UV light, storage is advantageously under exclusion of light.

The invention furthermore relates to a photopolymerizable composition comprising (a) a cyclic olefin or at least two different cyclic olefins and (b) a catalytically active amount of at least one heat-stable niobium(V) or tantalum (V) compound which contains at least two methyl groups or two monosubstituted methyl groups bound to the metal, the substituent containing no hydrogen atom in the α-position.

The composition according to the invention can additionally comprise other non-volatile open-chain comonomers which form copolymers with the tight cycloolefins. If, for example, dienes are co-used, crosslinked polymers can be formed. Some examples of such comonomers are olefinically mono- or di-unsaturated compounds, such as olefins and dienes from the group consisting of pentene, hexene, heptene, octene, decene and dodecylene, acrylic and methacrylic acid, esters and amides thereof, vinyl ethers, styrene, butadiene, isoprene and chlorobutadiene.

The composition according to the invention comprises the other olefins which are capable of metathesis polymerization in an amount of, for example, up to 80% by weight, preferably 0.1 to 80% by weight, more preferably 0.5 to 60% by weight, and particularly preferably 5 to 40% by weight, based on the total amount of compounds of the formula I and other olefins which are capable of metathesis polymerization.

The composition according to the invention can comprise formulation auxiliaries. Known auxiliaries are antistatics, antioxidants, light stabilizers, plasticizers, dyes, pigments, fillers, reinforcing fillers, lubricants, adhesion promoters, viscosity-increasing agents and mould release auxiliaries. The fillers can be present in surprisingly high proportions without adversely influencing the polymerization, for example in amounts of up to 70% by weight, preferably 1 to 70% by weight, more preferably 5 to 60% by weight, particularly preferably 10 to 50% by weight, and especially preferably 10 to 40% by weight, based on the composition. A very large number of fillers and reinforcing fillers for improving the optical, physical, mechanical and electrical properties have been disclosed. Some examples are glass and quartz in the form of powders, beads and fibres, metal and semimetal oxides, carbonates, such as MgCO$_3$, CaCO$_3$ and dolomite, metal sulfates, such as gypsum and barrite, naturally occurring and synthetic silicates, such as talc, zeolites, wollastonite and feldspars, aluminas, such as china clay, rock powders, whisker, carbon fibres, fibres or powders of plastics and carbon black. Viscosity-increasing agents are, in particular, metathesis polymers which contain olefinically unsaturated groups and can be incorporated into the polymer during the polymerization. Such metathesis polymers are known and are commercially obtainable, for example, under the tradename Vestenamere®. Other viscosity-increasing agents are polybutadiene, polyisoprene or polychlorobutadiene, as well as copolymers of butadiene, isoprene and chloroprene with olefins. The viscosity-increasing agents can be present in an amount of 0.1 to 50, preferably 1 to 30, and particularly preferably 1 to 20% by weight, based on the composition. If fillers are used, it is advantageous to obtain optical transparency for the polymerization or to carry out the polymerization in thin layers.

In the process according to the invention, it is not necessary to maintain irradiation of the reaction mixture over the entire duration of the reaction. Once the polymerization has been initiated photochemically, the subsequent course of the reaction takes place automatically, even in the dark. The irradiation is advantageously carried out with light of a wavelength in the range from 50 nm to 1000 nm, preferably in the range from 200 nm to 500 nm, and especially preferably in the UV range. The irradiation time depends on the nature of the light source. UV lasers or UV lamps are preferably employed according to the invention. Irradiation of the catalyst can be carried out either before, during or after addition of the monomers.

Suitable irradiation times are from one minute to 8 hours, in particular 5 minutes to 4 hours. The sequence of addition of monomers and catalyst is not critical. The monomer can either be initially introduced into the reaction vessel or be added after introduction of the catalyst. Likewise, the catalyst can be irradiated beforehand and then added to the monomer. Furthermore, the solution comprising catalyst and monomer can also be irradiated.

The process according to the invention is preferably carried out at room temperature to slightly elevated temperature. An increase in temperature serves to increase the rate of reaction. The catalysts used initiate thermal polymerization in themselves only in exceptional cases. A photopolymerization therefore predominantly takes place at the temperatures chosen for acceleration of the reaction. However, it should be mentioned that the catalysts can be converted into thermoactive catalysts by adequate irradiation.

In particular, the process according to the invention is carried out at temperatures from −20° C. to +110° C.

A very particular and surprising advantage of the process according to the invention is that the niobium(V) and tantalum(V) compounds used act as thermal catalysts after the irradiation. This results in the possibility of continuing and ending the polymerization by supplying heat after a short irradiation time, which offers economic and industrial advantages in various areas of production of shaped articles or coatings. In particular, the combined process is favourable for the preparation of thermoplastics.

The invention furthermore relates to a process for the photocatalytically induced and subsequent thermal polymerization of a cyclic olefin or at least two different cyclic olefins in the presence of a metal compound as catalyst, which comprises a) initially irradiating the cycloolefins in the presence of a catalytic amount of at least one heat-stable niobium(V) or tantalum(V) compound which contains at least two methyl groups or two monosubstituted methyl groups bound to the metal, the substituent containing no hydrogen atom in the α-position; or irradiating a catalytic amount of at least one heat-stable niobium(V) or tantalum (V) compound which contains at least two methyl groups or two monosubstituted methyl groups bound to the metal, the substituent containing no hydrogen atom in the α-position, if appropriate in an inert solvent, and then mixing this with at least one cycloolefin; and b) then ending the polymerization by heating and without irradiation.

The preferences defined above apply to process stage a). The irradiation time essentially depends on the desired reaction procedure. A short irradiation is chosen, for example, if the polymerization is to be only initiated by irradiation and ended by heating. Short can be an irradiation time of up to 60 seconds, preferably 5 to 60 seconds, and particularly preferably 10 to 40 seconds. A longer irradiation time is chosen, for example, if the polymerization is to be carried out chiefly by irradiation and the final polymerization is to be ended only by after-heating.

Heating in process stage b) can be a reaction temperature of 50° to 200° C., preferably 50° to 150° C., and particularly preferably 70° to 120° C.

Catalytic amounts in the context of the present invention are preferably an amount of 0.001 to 20 mol %, particularly preferably 0.01 to 15 mol %, and especially preferably 0.01 to 10 mol %, based on the amount of monomer.

The invention furthermore relates to a process for the preparation of thermal catalysts for the ring-opening metathesis polymerization of cyclic olefins, which comprises irradiating a heat-stable niobium(V) or tantalum(V) compound which contains at least two methyl groups or two monosubstituted methyl groups bound to the metal, the substituent containing no hydrogen atom in the α-position, in bulk or in a solvent.

The cycloolefins to be used according to the invention can be tight rings. Cyclohexene as an exception generally cannot be homopolymerized by olefin metathesis. This exception is known to the expert and described, for example, in Ivin [Ivin, K. J. in: Ivin, K. J., Saegusa, T. (editors), Ring-Opening Polymerisation 1: 139–144 Elsevier Applied Science Publishers, London and New York (1984)].

With the process according to the invention, radiation-cured oligomers and polymers having identical or different structural units of the formula XI

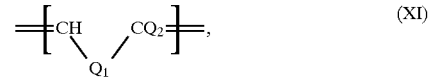

in which $Q_1$ and $Q_2$ are as defined under formula I can be prepared. The preferences defined above apply to these polymers. They can be homopolymers or copolymers having a random distribution of the structural units, graft polymers or block polymers. They can have an average molecular weight ($\overline{Mw}$) of, for example, 500 to 2,000,000 dalton, preferably 1000 to 1,000,000 dalton (determined by GPC by comparison with a polystyrene standard of narrow distribution).

Thermoplastically deformable materials for production of shaped articles of all types, coatings and relief images can be prepared by the process according to the invention.

The polymers prepared according to the invention can have very different properties, depending on the monomer used. Some are distinguished by a very high oxygen permeability, low dielectric constant, good heat stability and low absorption of water. Others have outstanding optical properties, for example high transparency and low refractive indices. The low shrinkage is furthermore to be mentioned in particular. They can therefore be used in widely varying industrial fields.

The compositions according to the invention are distinguished as layers on the surfaces of carrier materials by a high adhesive strength. The coated materials furthermore are distinguished by a very high surface smoothness and gloss. Among the good mechanical properties, the low shrinkage and high impact strength are to be singled out in particular, as well as the heat resistance. The easy removal from the mould and high resistance to solvents is furthermore to be mentioned.

These polymers are suitable for the production of medical equipment, implants or contact lenses; for the production of electronic components; as binders for paints; as photocurable compositions for model construction or as adhesives for gluing substrates having low surface energy (for example Teflon, polyethylene and polypropylene), and as a photopolymerizable composition in stereolithography. The compositions according to the invention can be used for the production of paints by photopolymerization, it being possible on the one hand for clear (transparent) and even pigmented compositions to be used. Either white or coloured pigments can be used. The production of shaped articles by thermoplastic shaping processes for all types of items of everyday use furthermore is to be mentioned.

The photocurable or photo- and heat-curable compositions according to the invention are particularly suitable for the production of protective layers and relief images. The invention furthermore relates to a variant of the process according to the invention for the production of coated materials or relief images on substrates, in which a composition of cyclic olefin, catalyst and, if appropriate, solvent is applied as a layer to a carrier, for example by dipping, brushing, casting, rolling, knife-coating or whirler-coating processes, the solvent is removed, if appropriate, and the layer is irradiated for polymerization, or the layer is irradiated through a photo-mask and the non-irradiated portions are then removed with a solvent. Surfaces of substrates can be modified or protected or, for example, printed circuits, printing plates or printing rollers can be produced by this process. In the production of printed circuits, the compositions according to the invention can also be employed as solder resists. Other possible uses are the production of screen printing masks and use as radiation-curing printing inks for offset, screen and flexographic printing.

The present invention furthermore relates to a carrier material which is coated with an oligomer or polymer according to the invention and which comprises a crosslinking agent. The present invention furthermore relates to a carrier material which is coated with an oligomer or polymer according to the invention. These materials are suitable for the production of protective coatings or relief images by irradiation (if appropriate under a photo-mask) and subsequent development with a solvent. Suitable crosslinking agents, which the materials can comprise, for example, in an amount of 0.01 to 20% by weight, are, in particular, organic bisazides, in particular the commercially obtainable 2,6-bis(4-azidobenzylidene)-4-methyl-cyclohexanone.

The present invention furthermore relates to a coated carrier material, wherein a layer of (a) a cyclic olefin or at least two different cyclic olefins and (b) a catalytically active amount of at least one heat-stable niobium(V) or tantalum (V) compound which contains at least two methyl groups or two monosubstituted methyl groups bound to the metal, the substituent containing no hydrogen atom in the α-position, is applied to a carrier.

Suitable carrier materials are, for example, those of glass, minerals, ceramics, plastics, wood, metalloids, metals, metal oxides and metal nitrides. The layer thicknesses essentially depend on the desired use, and can be, for example, 0.1 to 1000 μm, preferably 0.5 to 500 μm, particularly preferably 1 to 100 μm. The coated materials are distinguished by a high adhesive strength and good thermal and mechanical properties.

The coated materials according to the invention can be prepared by known methods, such as, for example, brushing, knife-coating and casting processes, such as curtain casting or whirler casting.

Particularly good results are often achieved in coatings if cycloolefins which additionally contain 1 to three, and preferably one further double bond and which are polycyclic fused ring systems in the context of the invention are used for the photometathesis polymerization.

The following examples illustrate the invention further.

EXAMPLE 1 TO 7

Polymerization of cyclolefins

The catalyst in toluene is initially introduced into a Schlenk vessel. The cycloolefin in toluene is then added and the vessel is closed. The mixture is irradiated while stirring. After about 15 seconds, an increase in viscosity is observed. After 5 minutes, the reaction is discontinued by addition of one drop of benzaldehyde and the reaction mixture is poured into 100 ml of ethanol. The polymer which has precipitated out is filtered off, washed with ethanol and then dried in vacuo. The polymer is characterized by gel permeation chromatography [GPC; solvent tetrahydrofuran, the number- ($M_n$) and weight-average values ($M_w$) of the molecular weight are determined relative to polystyrene calibration standards] and $^1$H-NMR (Bruker 300 MHz; solvent $CDCl_3$).

An identical experiment without exposure to light at 45° C. gives no increase in viscosity and, after addition of ethanol, no polymer precipitates out.

The catalysts employed are:
A=$Ta[CH_2Si(CH_3)_3]_3Cl_2$
B=$Ta[2,6-(CH_3)_2C_6H_3O]_2(CH_3)_3$
C=$Ta[CH_2Si(CH_3)_3][OCH(CH_3)_2]_2$
D=$Nb[2,6-(CH_3)_2C_6H_3O]_2(CH_3)_3$
E=$Ta[2,6-(CH_3)_2CHC_6H_3O](CH_3)_3$ Compounds (1) and (20) are employed as monomers.
The sources of light used are:
(a) 200 W mercury vapour medium-pressure UV lamp (Osram HBO 200 W/2, manufacturer Spindler & Hoyer, Göttingen).
(b) UV irradiation apparatus constructed in-house with 4×40 W R-UVA lamps TL 40 W/10 R and 2×20 W TL 20 W/05 from Philips. Distance about 25 cm.

The results are given in Table 1:

TABLE 1

| Example | Catalyst | Exposure | Standing time | Yield | MW |
|---|---|---|---|---|---|
| 1 | 100 mg A | 3 min (a) | — | 100% | $M_n$ = 16 k |
| 2 | 10 mg C | 10 min (a) | 14 h 50° C. | 4% | crosslinked |
| 3 | 10 mg B | 10 min (a) | 14 h 50° C. | 35% | $M_n$ = 25 k |
| 4 | 10 mg E | 10 min (a) | 14 h 50° C. | 90% | $M_n$ = 165 k |
| 5 | 10 mg D | 3 min (a) | — | 80% | $M_n$ = 2320 k |
| 6 | 250 mg A | 2 h (b) | 1 h 80° C. | 100% | crosslinked |
| 7 | 250 mg B | 14 h (b) | 14 h 50° C. | 100% | crosslinked |

Monomer: 500 mg of (20) in Example 1 to 5 (solvent: 5 ml of toluene); 25 g of (1) in Examples 6 and 7 (in bulk)

Exposure: light source (a) or (b) at 25° C.
Standing time: before working up
MW: molecular weight (GPC, g/mol)

We claim:

1. A process for the photocatalytic polymerization of a cyclic olefin or at least two different cyclic olefins in the presence of a metal compound as catalyst, which comprises carrying out a photochemical ring-opening metathesis polymerization in the presence of a catalytic amount of at least one heat-stable niobium(V) or tantalum(V) compound which contains at least two methyl groups or two monosubstituted methyl groups bound to the metal, the substituent containing no hydrogen atom in the α-position.

2. A process according to claim 1, wherein the cyclic olefins are monocyclic rings or polycyclic, bridged or fused ring systems having 2 to 4 rings, which are unsubstituted or substituted and contain, if desired, one or more heteroatoms from the group consisting of O, S, N and Si in one or more rings, and, if desired, fused aromatic or heteroaromatic rings.

3. A process according to claim 2, wherein the cyclic rings contain 3 to 16 ring members.

4. A process according to claim 3, wherein the cyclic rings contain 3 to 12 ring members.

5. A process according to claim 2, wherein the cyclic olefins contain further non-aromatic double bonds.

6. A process according to claim 1, wherein the cycloolefins are those of the formula I $$CH\!=\!CQ_2 \diagdown\!\!\!\!\diagup Q_1 \qquad (I)$$

in which $Q_1$ is a radical having at least one carbon atom which, together with the —CH=$CQ_2$— group, forms an at least 3-membered alicyclic ring which contains, if desired, one or more heteroatoms chosen from the group consisting of silicon, phosphorus, oxygen, nitrogen and sulfur; and which is unsubstituted or substituted by halogen, =O, —CN, —$NO_2$, $R_1R_2R_3$Si—$(O)_u$—, —COOM, —$SO_3$M, —$PO_3$M, —COO$(M_1)_{1/2}$, —$SO_3(M_1)_{1/2}$, —$PO_3(M_1)_{1/2}$, $C_1$–$C_{20}$alkyl, $C_1$–$C_{20}$hydroxyalkyl, $C_1$–$C_{20}$haloalkyl, $C_1$–$C_6$cyanoalkyl, $C_3$–$C_8$cycloalkyl, $C_6$–$C_{16}$aryl, $C_7$–$C_{16}$aralkyl, $C_3$–$C_6$heterocycloalkyl, $C_3$–$C_{16}$heteroaryl, $C_4$–$C_{16}$heteroaralkyl or $R_4$–X—; or in which two adjacent C atoms are substituted by —CO—O—CO— or —CO—$NR_5$—CO—; or in which, if desired, an alicyclic, aromatic or heteroaromatic ring, which is unsubstituted or substituted by halogen, —CN, —$NO_2$, $R_6R_7R_8$Si—$(O)_u$—, —COOM, —$SO_3$M, —$PO_3$M, —COO$(M_1)_{1/2}$, —$SO_3(M_1)_{1/2}$, —$PO_3(M_1)_{1/2}$, $C_1$–$C_{20}$alkyl, $C_1$–$C_{20}$haloalkyl, $C_1$–$C_{20}$hydroxyalkyl, $C_1$–$C_6$cyanoalkyl, $C_3$–$C_8$cycloalkyl, $C_6$–$C_{16}$aryl, $C_7$–$C_{16}$aralkyl, $C_3$–$C_6$heterocycloalkyl, $C_3$–$C_{16}$heteroaryl, $C_4$–$C_{16}$heteroaralkyl or $R_{13}$—X—, is fused onto adjacent carbon atoms of the alicyclic ring;

X and $X_1$ independently of one another are —O—, —S—, —CO—, —SO—, —$SO_2$—, —O—C(O)—, —C(O)—O—, —C(O)—$NR_5$—, —$NR_{10}$—C(O)—, —$SO_2$—O— or —O—$SO_2$—;

$R_1$, $R_2$ and $R_3$ independently of one another are $C_1$–$C_{12}$alkyl, $C_1$–$C_{12}$perfluoroalkyl, phenyl or benzyl;

$R_4$ and $R_{13}$ independently of one another are $C_1$–$C_{20}$alkyl, $C_1$–$C_{20}$haloalkyl, $C_1$–$C_{20}$hydroxyalkyl, $C_3$–$C_8$cycloalkyl, $C_6$–$C_{16}$aryl or $C_7$–$C_{16}$aralkyl;

$R_5$ and $R_{10}$ independently of one another are hydrogen, $C_1$–$C_{12}$alkyl, phenyl or benzyl, the alkyl groups in turn being unsubstituted or substituted by $C_1$–$C_{12}$alkoxy or $C_3$–$C_8$cycloalkyl;

$R_6$, $R_7$ and $R_8$ independently of one another are $C_1$–$C_{12}$alkyl, $C_1$–$C_{12}$perfluoroalkyl, phenyl or benzyl;

M is an alkali metal and $M_1$ is an alkaline earth metal; and u is 0 or 1;

and in which the alicyclic ring formed with $Q_1$ contains, if desired, further non-aromatic double bonds;

$Q_2$ is hydrogen, $C_1$–$C_{20}$alkyl, $C_1$–$C_{20}$haloalkyl, $C_1$–$C_{12}$alkoxy, halogen, —CN or $R_{11}$—$X_2$—;

$R_{11}$ is $C_1$–$C_{20}$alkyl, $C_1$–$C_{20}$haloalkyl, $C_1$–$C_{20}$hydroxyalkyl, $C_3$–$C_8$cycloalkyl, $C_6$–$C_{16}$aryl or $C_7$–$C_{16}$aralkyl;

$X_2$ is —C(O)—O— or —C(O)—$NR_{12}$—;

$R_{12}$ is hydrogen, $C_1$–$C_{12}$alkyl, phenyl or benzyl;

and in which the abovementioned cycloalkyl, heterocycloalkyl, aryl, heteroaryl, aralkyl and heteroaralkyl groups are unsubstituted or substituted by $C_1$–$C_{12}$alkyl, $C_1$–$C_{12}$alkoxy, —$NO_2$, —CN or halogen, and in which the heteroatoms of the abovementioned heterocycloalkyl, heteroaryl and heteroaralkyl groups are chosen from the group consisting of —O—, —S—, —$NR_9$— and —N=; and $R_9$ is hydrogen, $C_1$–$C_{12}$alkyl, phenyl or benzyl.

7. A process according to claim 6, wherein the alicyclic ring which $Q_1$ forms together with the —CH=$CQ_2$— group has 3 to 16 ring atoms, and wherein the ring is a monocyclic, bicyclic, tricyclic or tetracyclic ring system.

8. A process according to claim 6, wherein $Q_2$ in formula I is hydrogen.

9. A process according to claim 6, wherein, in the compounds of the formula I, $Q_1$ is a radical having at least one carbon atom which, together with the —CH=$CQ_2$— group, forms a 3- to 20-membered alicyclic ring which contains, if desired, one or more heteroatoms chosen from the group consisting of silicon, oxygen, nitrogen and sulfur; and which is unsubstituted or substituted by halogen, =O, —CN, —$NO_2$, $R_1R_2R_3$Si—$(O)_u$—, —COOM, —$SO_3$M, —$PO_3$M, —COO$(M_1)_{1/2}$, —$SO_3(M_1)_{1/2}$, $C_1$–$C_{12}$alkyl, $C_1$–$C_{12}$haloalkyl, $C_1$–$C_{12}$hydroxyalkyl, $C_1$–$C_4$cyanoalkyl, $C_3$–$C_6$cycloalkyl, $C_6$–$C_{12}$aryl, $C_7$–$C_{12}$aralkyl, $C_3$–$C_6$heterocycloalkyl, $C_3$–$C_{12}$heteroaryl, $C_4$–$C_{12}$heteroaralkyl or $R_4$-X—; or in which two adjacent C atoms in this radical $Q_1$ are substituted by —CO—O—CO— or —CO—$NR_5$—CO—; or in which, if desired, an alicyclic, aromatic or heteroaromatic ring which is unsubstituted or substituted by halogen, —CN, —$NO_2$, $R_6R_7R_8$Si—, —COOM, —$SO_3$M, —$PO_3$M, —COO$(M_1)_{1/2}$, —$SO_3(M_1)_{1/2}$, —$PO_3(M_1)_{1/2}$, $C_1$–$C_{12}$alkyl, $C_1$–$C_{12}$haloalkyl, $C_1$–$C_{12}$hydroxyalkyl, $C_1$–$C_4$cyanoalkyl, $C_3$–$C_6$cycloalkyl, $C_6$–$C_{12}$aryl, $C_7$–$C_{12}$aralkyl, $C_3$–$C_6$heterocycloalkyl, $C_3$–$C_{12}$heteroaryl, $C_4$–$C_{12}$heteroaralkyl or $R_{13}$—$X_1$— is fused onto adjacent carbon atoms;

X and $X_1$ independently of one another are —O—, —S—, —CO—, —SO—, —$SO_2$—, —O—C(O)—, —C(O)—O—, —C(O)—$NR_5$—, —$NR_{10}$—C(O)—, —$SO_2$—O— or —O—$SO_2$—;

$R_1$, $R_2$ and $R_3$ independently of one another are $C_1$–$C_6$alkyl, $C_1$–$C_6$perfluoroalkyl, phenyl or benzyl;

M is an alkali metal and $M_1$ is an alkaline earth metal;

$R_4$ and $R_{13}$ independently of one another are $C_1$–$C_{12}$alkyl, $C_1$–$C_{12}$haloalkyl, $C_1$–$C_{12}$hydroxyalkyl, $C_3$–$C_8$cycloalkyl, $C_6$–$C_{12}$aryl or $C_7$–$C_{12}$aralkyl;

$R_5$ and $R_{10}$ independently of one another are hydrogen, $C_1$–$C_6$alkyl, phenyl or benzyl, the alkyl groups in turn being unsubstituted or substituted by $C_1$–$C_6$alkoxy or $C_3$–$C_6$cycloalkyl;

$R_6$, $R_7$ and $R_8$ independently of one another are $C_1$–$C_6$alkyl, $C_1$–$C_6$perfluoroalkyl, phenyl or benzyl;

u is 0 or 1;

and in which the alicyclic ring formed with $Q_1$ contains, if desired, contain further non-aromatic double bonds;

$Q_2$ is hydrogen, $C_1$–$C_{12}$alkyl, $C_1$–$C_{12}$haloalkyl, $C_1$–$C_6$alkoxy, halogen, —CN or $R_{11}$—$X_2$—;

$R_{11}$ is $C_1$–$C_{12}$alkyl, $C_1$–$C_{12}$haloalkyl, $C_1$–$C_{12}$hydroxyalkyl, $C_3$–$C_6$cycloalkyl, $C_6$–$C_{12}$aryl or $C_7$–$C_{12}$aralkyl;

$X_2$ is —C(O)—O— or —C(O)—$NR_{12}$—; and $R_{12}$ is hydrogen, $C_1$–$C_6$alkyl, phenyl or benzyl;

in which the cycloalkyl, heterocycloalkyl, aryl, heteroaryl, aralkyl and heteroaralkyl groups are unsubstituted or substituted by $C_1$–$C_6$alkyl, $C_1$–$C_6$alkoxy, —$NO_2$, —CN or halogen, and in which the heteroatoms of the heterocycloalkyl, heteroaryl and heteroaralkyl groups are chosen from the group consisting of —O—, —S—, —$NR_9$— and —N=; and $R_9$ is hydrogen, $C_1$–$C_6$alkyl, phenyl or benzyl.

10. A process according to claim 6, wherein, in the compounds of the formula I, $Q_1$ is a radical having at least one carbon atom which, together with the —CH=$CQ_2$— group, forms a 3- to 10-membered alicyclic ring which contains, if desired, a heteroatom chosen from the group consisting of silicon, oxygen, nitrogen and sulfur and which is unsubstituted or substituted by halogen, —CN, —$NO_2$, $R_1R_2R_3$Si—, —COOM, —$SO_3$M, —$PO_3$M, —COO$(M_1)_{1/2}$, —$SO_3(M_1)_{1/2}$, —$PO_3(M_1)_{1/2}$, $C_1$–$C_6$alkyl, $C_1$–$C_6$haloalkyl, $C_1$–$C_6$hydroxyalkyl, $C_1$–$C_4$cyanoalkyl, $C_3$–$C_6$cycloalkyl, phenyl, benzyl or $R_4$–X—; or in which, if desired, an alicyclic, aromatic or heteroaromatic ring which is unsubstituted or substituted by halogen, —CN, —$NO_2$, $R_6R_7R_8$Si—, —COOM, —$SO_3$M, —$PO_3$M, —COO$(M_1)_{1/2}$, —$SO_3(M_1)_{1/2}$, —$PO_3(M_1)_{1/2}$, $C_1$–$C_6$alkyl, $C_1$–$C_6$haloalkyl, $C_1$–$C_6$hydroxyalkyl, $C_1$–$C_4$cyanoalkyl, $C_3$–$C_6$cycloalkyl, phenyl, benzyl or $R_{13}$—$X_1$— is fused onto adjacent carbon atoms;

$R_1$, $R_2$ and $R_3$ independently of one another are $C_1$–$C_4$alkyl, $C_1$–$C_4$perfluoroalkyl, phenyl or benzyl;

M is an alkali metal and $M_1$ is an alkaline earth metal;

$R_4$ and $R_{13}$ independently of one another are $C_1$–$C_6$alkyl, $C_1$–$C_6$haloalkyl, $C_1$–$C_6$hydroxyalkyl or $C_3$–$C_6$cycloalkyl;

X and $X_1$ independently of one another are —O—, —S—, —CO—, —SO— or —$SO_2$—;

$R_6$, $R_7$ and $R_8$ independently of one another are $C_1$–$C_4$alkyl, $C_1$–$C_4$perfluoroalkyl, phenyl or benzyl; and $Q_2$ is hydrogen.

11. A process according to claim 1, wherein the cyclic olefins are norbornene or norbornene derivatives.

12. A process according to claim 11, wherein the norbornene derivatives are those of the formula II

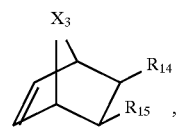
(II)

in which $X_3$ is —$CHR_{16}$—, oxygen or sulfur;

$R_{14}$ and $R_{15}$ independently of one another are hydrogen, —CN, trifluoromethyl, $(CH_3)_3$Si—O—, $(CH_3)_3$Si— or —$COOR_{17}$; and $R_{16}$ and $R_{17}$ independently of one another are hydrogen, $C_1$–$C_{12}$alkyl, phenyl or benzyl; or those of the formula III

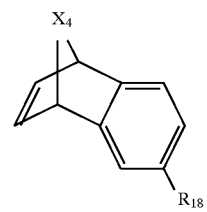
(III)

in which $X_4$ is —$CHR_{19}$—, oxygen or sulfur;

$R_{19}$ is hydrogen, $C_1$–$C_{12}$alkyl, phenyl or benzyl; and $R_{18}$ is hydrogen, $C_1$–$C_6$alkyl or halogen;

or those of the formula IV

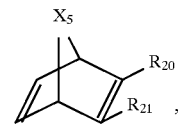
(IV)

in which $X_5$ is —$CHR_{22}$—, oxygen or sulfur;

$R_{22}$ is hydrogen, $C_1$–$C_{12}$alkyl, phenyl or benzyl;

$R_{20}$ and $R_{21}$ independently of one another are hydrogen, CN, trifluoromethyl, $(CH_3)_3$Si—O—, $(CH_3)_3$Si— or —$COOR_{23}$; and $R_{23}$ is hydrogen, $C_1$–$C_{12}$alkyl, phenyl or benzyl;

or those of the formula V

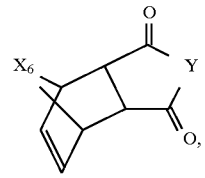
(V)

in which $X_6$ is —$CHR_{24}$—, oxygen or sulfur, $R_{24}$ is hydrogen, $C_1$–$C_{12}$alkyl, phenyl or benzyl;

Y is oxygen or

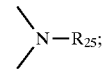

and $R_{25}$ is hydrogen, methyl, ethyl or phenyl.

13. A process according to claim 1, wherein two or three methyl groups or monosubstituted methyl groups are bound to the metal atom as ligands.

14. A process according to claim 1, wherein the methyl group or monosubstituted methyl group bound to the metal atom corresponds to the formula VII

$$—CH_2—R \quad (VII),$$

in which R is H, $—CF_3$, $—CR_{26}R_{27}R_{28}$, $—SiR_{29}R_{30}R_{31}$, $C_6–C_{16}$aryl which is unsubstituted or substituted by $C_1–C_6$alkyl or $C_1–C_6$alkoxy, or $C_4–C_{15}$heteroaryl which has 1 to 3 heteroatoms from the group consisting of O, S and N; and $R_{26}$, $R_{27}$ and $R_{28}$ independently of one another are $C_1–C_{10}$alkyl, which is unsubstituted or substituted by $C_1–C_{10}$alkoxy, or $R_{26}$ and $R_{27}$ have this meaning and $R_{28}$ is $C_6–C_{10}$aryl or $C_4–C_9$heteroaryl, which is unsubstituted or by $C_1–C_6$alkyl or $C_1–C_6$alkoxy; and $R_{29}$, $R_{30}$ and $R_{31}$ independently of one another are $C_1–C_6$alkyl, $C_5$- or $C_6$-cycloalkyl, or phenyl or benzyl which are unsubstituted or substituted by $C_1–C_6$alkyl or $C_1–C_6$alkoxy.

15. A process according to claim 14, wherein the group R in formula VII is H, $—C(CH_3)_3$, $—C(CH_3)_2C_6H_5$, phenyl which is unsubstituted or substituted by methyl, ethyl, methoxy or ethoxy, $—CF_3$, or $—Si(CH_3)_3$.

16. A process according to claim 1, wherein the other 1 to 3 valencies of the Nb(V) and Ta(V) atoms are saturated with identical or different ligands from the group consisting of =O, =N—$R_{33}$, secondary amines having 2 to 18 C atoms, $R_{32}$O—, $R_{32}$S—, halogen, cyclopentadienyl, bridged biscyclopentadienyl, tridentate monoanionic ligands and neutral ligands, in which the $R_{32}$ independently of one another are linear or branched $C_1–C18$alkyl which is unsubstituted or substituted by $C_1–C_6$alkoxy or halogen, $C_5$- or $C_6$cycloalkyl which is unsubstituted or substituted by $C_1–C_6$alkyl, $C_1–C_6$alkoxy or halogen, phenyl which is unsubstituted or substituted by $C_1–C_6$alkyl, $C_1–C_6$alkoxy, $C_1–C_6$alkoxymethyl, $C_1–C_6$alkoxyethyl, di($C_1–C_6$alkyl)amino, di($C_1–C_6$alkyl)amino-$C_1–C_3$-alkyl or halogen, or benzyl or phenylethyl which are unsubstituted or substituted by $C_1–C_6$alkyl, $C_1–C_6$alkoxy, $C_1–C_6$alkoxymethyl, $C_1–C_6$alkoxyethyl, di($C_1–C_6$alkyl)amino, di($C_1–C_6$alkyl)amino-$C_1–C_3$-alkyl or halogen; and $R_{33}$ is linear or branched $C_1–C_{18}$alkyl which is unsubstituted or substituted by $C_1–C_6$alkoxy, $C_5$- or $C_6$cycloalkyl which is unsubstituted or substituted by $C_1–C_6$alkyl, $C_1–C_6$alkoxy or halogen, phenyl which is unsubstituted or substituted by $C_1–C_6$alkyl, $C_1–C_6$alkoxy, $C_1–C_6$alkoxymethyl, $C_1–C_6$alkoxyethyl, di($C_1–C_6$alkyl)amino, di($C_1–C_6$alkyl)amino-$C_1–C_3$alkyl or halogen, or benzyl or phenylethyl which are unsubstituted or substituted by $C_1–C_6$alkyl, $C_1–C_6$alkoxy, $C_1–C_6$alkoxymethyl, $C_1–C_6$alkoxyethyl, di($C_1–C_6$alkyl)amino, di($C_1–C_6$alkyl)amino-$C_1–C_3$-alkyl or halogen.

17. A process according to claim 1, wherein the niobium and tantalum compounds have the formula VIII

(VIII)

in which
Me is Nb(V) or Ta(V),
at least two of the radicals $R_{39}$ to $R_{43}$ are a radical $—CH_2—R$ of the formula VII, in which R is H, $—CF_3$, $—CR_{26}R_{27}R_{28}$, $—SiR_{29}R_{30}R_{31}$, $C_6–C_{16}$aryl which is unsubstituted or substituted by $C_1–C_6$alkyl or $C_1–C_6$alkoxy, or $C_4–C_{15}$heteroaryl with 1 to 3 heteroatoms from the group consisting of O, S and N;

$R_{26}$, $R_{27}$ and $R_{28}$ independently of one another are $C_1–C_{10}$alkyl, which is unsubstituted or substituted by $C_1–C_{10}$alkoxy, or $R_{26}$ and $R_{27}$ have this meaning and $R_{28}$ is $C_6–C_{10}$aryl or $C_4–C_9$heteroaryl, which is unsubstituted or substituted by $C_1–C_6$alkyl or $C_1–C_6$alkoxy; and $R_{29}$, $R_{30}$ and $R_{31}$ independently of one another are $C_1–C_6$alkyl, $C_5$- or $C_6$cycloalkyl, or phenyl or benzyl which are unsubstituted or substituted by $C_1–C_6$alkyl or $C_1–C_6$alkoxy; two of the other radicals of $R_{39}$ to $R_{43}$ together are =O or =N—$R_{33}$, or =N—$R_{33}$, and $R_{33}$ is linear or branched $C_1–C_{18}$alkyl which is unsubstituted or substituted by $C_1–C_6$alkoxy, $C_5$- or $C_6$cycloalkyl which is unsubstituted or substituted by $C_1–C_6$alkyl, $C_1–C_6$alkoxy or halogen, phenyl which is unsubstituted or substituted by $C_1–C_6$alkyl, $C_1–C_6$alkoxy, $C_1–C_6$alkoxymethyl, $C_1–C_6$alkoxyethyl, di($C_1–C_6$alkyl)amino, di($C_1–C_6$alkyl)amino-$C_1–C_3$alkyl or halogen, or benzyl or phenylethyl which are unsubstituted or substituted by $C_1–C_6$alkyl, $C_1–C_6$alkoxy, $C_1–C_6$alkoxymethyl, $C_1–C_6$alkoxyethyl, di($C_1–C_6$alkyl)amino, di($C_1–C_6$alkyl)amino-$C_1–C_3$alkyl or halogen; and/or the other radicals of $R_{39}$ to $R_{43}$ independently of one another are secondary amino having 2 to 18 C atoms, $R_{32}$O— or $R_{32}$S—, halogen, cyclopentadienyl or bridged biscyclopentadienyl or a neutral ligand, in which the $R_{32}$ independently of one another are linear or branched $C_1–C_{18}$alkyl which is unsubstituted or substituted by $C_1–C_6$alkoxy or halogen, $C_5$- or $C_6$cycloalkyl which is unsubstituted or substituted by $C_1–C_6$alkyl, $C_1–C_6$alkoxy or halogen, phenyl which is unsubstituted or substituted by $C_1–C_6$alkyl, $C_1–C_6$alkoxy, $C_1–C_6$alkoxymethyl, $C_1–C_6$alkoxyethyl, di($C_1–C_6$alkyl)amino, di($C_1–C_6$alkyl)-amino-$C_1–C_3$alkyl or halogen, or benzyl or phenylethyl which are unsubstituted or substituted by $C_1–C_6$alkyl, $C_1–C_6$alkoxy, $C_1–C_6$alkoxymethyl, $C_1–C_6$alkoxyethyl, di($C_1–C_6$alkyl)amino, di($C_1–C_6$alkyl)amino-$C_1–C_3$alkyl or halogen.

18. A process according to claim 17, wherein two or three of the radicals $R_{39}$ to $R_{43}$ are a radical $—CH_2R$ of the formula VII.

19. A process according to claim 1, wherein niobium and tantalum compounds of the formula VIII in which a) $R_{39}$ to $R_{43}$ are each a radical of the formula VII $—CH_2—R$, or b) $R_{39}$ and $R_{40}$ are each a radical of the formula VII $—CH_2—R$, $R_{41}$ and $R_{42}$ together are the radical =N—$R_{33}$ and $R_{43}$ is unsubstituted or substituted cyclopentadienyl, $R_{32}$—O— or halogen, or c) $R_{39}$, $R_{40}$ and $R_{41}$ are each a radical of the formula VII $—CH_2—R$ and $R_{42}$ and $R_{43}$ together are the radical =N—$R_{33}$, or $R_{39}$, $R_{40}$, $R_{41}$ and $R_{42}$ are each a radical of the formula VII $—CH_2—R$ and $R_{43}$ is unsubstituted or substituted cyclopentadienyl, $R_{32}$—O— or halogen, in which R, $R_{32}$ and $R_{33}$ are as defined in claim 17, are used.

20. A process according to claim 1, wherein niobium(V) and tantalum(V) compounds of the formulae IX, IXa or IXb

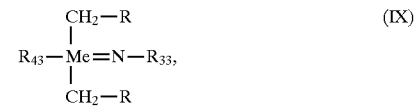
(IX)

-continued

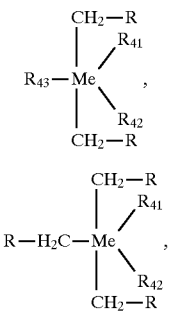

(IXa)

(IXb)

in which

Me is Nb(V) or Ta(V),

R is H, —C(CH$_3$)$_3$, —C(CH$_3$)$_2$—C$_6$H$_5$, —C$_6$H$_5$ or —Si(C$_1$–C$_4$alkyl)$_3$, R$_{33}$ is phenyl or phenyl which is substituted by one to three C$_1$–C$_4$alkyl or C$_1$–C$_4$alkoxy, R$_{43}$ in formula IX is the group —CH$_2$—R or F, Cl, Br, linear or, in particular, branched C$_1$–C$_4$alkoxy which is unsubstituted or substituted by fluorine, phenyloxy which is unsubstituted or substituted by C$_1$–C$_4$alkyl or C$_1$–C$_4$alkoxy, or cyclopentadienyl which is unsubstituted or substituted by C$_1$–C$_4$alkyl;

R$_{41}$, R$_{42}$ and R$_{43}$ in formula IXa independently of one another are F, Cl, Br, linear or branched C$_1$–C$_4$alkoxy which is unsubstituted or substituted by fluorine, phenyloxy which is unsubstituted or substituted by C$_1$–C$_4$alkyl or C$_1$–C$_4$alkoxy, or cyclopentadienyl which is unsubstituted or substituted by C$_1$–C$_4$alkyl; and R$_{41}$ and R$_{42}$ in formula IXb are F, Cl, Br, linear or branched C$_1$–C$_4$alkoxy which is unsubstituted or substituted by fluorine, phenyloxy which is unsubstituted or substituted by C$_1$–C$_4$alkyl or C$_1$–C$_4$alkoxy, or cyclopentadienyl which is unsubstituted or substituted by C$_1$–C$_4$alkyl, are used.

21. A process according to claim 1, wherein niobium(V) and tantalum(V) compounds of the formulae Me[CH$_2$Si(CH$_3$)$_3$]$_5$, Cp$_2$Me[(CH$_2$C(CH$_3$)$_2$—C$_6$H$_5$)]$_3$, Me(=N-2,6-dimethylC$_6$H$_3$)(CH$_3$)$_3$, Me(=N—C$_6$H$_5$)[OC(CH$_3$)$_3$][(CH$_2$Si(CH$_3$)$_3$)]$_2$, Me(=N-2,6-diisopropylC$_6$H$_3$)[(CH$_2$—C$_6$H$_5$)]$_3$, Me(=N—C$_6$H$_5$)[OCCH$_3$(CF$_3$)$_2$][(CH$_2$Si(CH$_3$)$_3$)]$_2$, CpMe[OCCH$_3$(CF$_3$)$_2$]$_2$[(CH$_2$—C$_6$H$_5$)]$_2$, Me(=N-2,6-diisopropylC$_6$H$_3$)[(CH$_2$C(CH$_3$)$_2$—C$_6$H$_5$)]$_2$Cl, Cp$_2$Me(CH$_3$)$_2$[OCH(CH$_3$)$_2$], Me(=N-2,6-dimethylC$_6$H$_3$)[(CH$_2$—C$_6$H$_5$)]$_3$, CpMe[OCH(CH$_3$)$_2$]$_2$[(CH$_2$Si(CH$_3$)$_3$)]$_2$, Cp$_2$Me[(CH$_2$—C$_6$H$_5$)]$_3$, Me[CH$_2$Si(CH$_3$)$_3$]$_3$Cl$_2$, Me[CH$_2$Si(CH$_3$)$_3$]$_3$[OCH$_2$C(CH$_3$)$_3$]$_2$, Cp$_2$Me[3,5-dimethylC$_6$H$_3$O)][(CH$_2$Si(CH$_3$)$_3$)]$_2$, Me(2,6-diisopropylphenyloxy)$_2$(CH$_3$)$_3$, Cp$_2$Me(CH$_3$)$_3$, Me(2,6-dimethylphenyloxy)$_2$(CH$_3$)$_3$, Me[CH$_2$Si(CH$_3$)$_3$]$_3$[OCH(CH$_3$)]$_2$, CpMe[OC(CH$_3$)$_3$]$_2$[(CH$_2$—C$_6$H$_5$)]$_2$, Cp$_2$Me[(CH$_2$Si(CH$_3$)$_3$)]$_3$, in which Cp is cyclopentadienyl and Me is Nb(V) or Ta(V)), are used.

22. A process for the photocatalytically induced and subsequent thermal polymerization of a cyclic olefin or at least two different cyclic olefins in the presence of a metal compound as the catalyst according to claim 1, which comprises a) carrying out a photochemical ring-opening metathesis polymerization by initially irradiating the cycloolefins in the presence of a catalytic amount of at least one heat-stable niobium(V) or tantalum(V) compound which contains at least two methyl groups or two monosubstituted methyl groups bound to the metal, the substituent containing no hydrogen in the α-position; or irradiating a catalytic amount of at least one heat-stable niobium(V) or tantalum(V) compound which contains at least two methyl groups or two monosubstituted methyl groups bound to the metal, the substituent containing no hydrogen atom in the α-position, if appropriate in an inert solvent, and then mixing this with at least one cycloolefin; and b) then ending the polymerization by heating and without irradiation.

23. A process according to claim 1, wherein the niobium (V) and tantalum(VI) compounds are employed in an amount of 0.001 to 20 mol %, based on the amount of the cycloolefin.

24. A composition comprising (a) a cyclic olefin or at least two different cyclic olefins and (b) a catalytically active amount of at least one heat-stable niobium(V) or tantalum (V) compound which contains at least two methyl groups or two monosubstituted methyl groups bound to the metal, the substituent containing no hydrogen atom in the α-position.

25. A coated carrier material, wherein a layer of (a) a cyclic olefin or at least two different cyclic olefins and (b) a catalytically active amount of at least one heat-stable niobium(V) or tantalum(V) compound which contains at least two methyl groups or two monosubstituted methyl groups bound to the metal, the substituent containing no hydrogen atom in the α-position, is applied to a carrier.

26. A process for the preparation of a coated material or relief image on carriers, in which a composition according to claim 24 is applied, the solvent is removed, if appropriate, and the layer is irradiated, for polymerization, and if appropriate after-cured by means of heat, or the layer is irradiated through a photomask and, if appropriate, after-cured by means of heat and the non-irradiated portions are then removed with a solvent.

* * * * *